United States Patent [19]

Koyama

[11] Patent Number: 4,683,707

[45] Date of Patent: Aug. 4, 1987

[54] SYSTEM FOR PACKAGING, WEIGHING AND LABELING ARTICLES

[75] Inventor: Kazuo Koyama, Kurita, Japan

[73] Assignee: Ishida Scales Mfg. Co., Ltd., Kyoto, Japan

[21] Appl. No.: 782,416

[22] Filed: Oct. 1, 1985

[30] Foreign Application Priority Data

Oct. 1, 1984 [JP] Japan .......................... 59-149352[U]
Oct. 1, 1984 [JP] Japan .......................... 59-149353[U]
Nov. 1, 1984 [JP] Japan ............................... 59-232142
Nov. 2, 1984 [JP] Japan .......................... 59-167210[U]

[51] Int. Cl.⁴ .......................... B65C 1/02; B65C 9/06; B65C 9/14
[52] U.S. Cl. ...................................... 53/502; 53/137; 53/131; 156/542; 198/787
[58] Field of Search .......................... 53/502, 137, 131; 198/456, 787; 271/18.5, 225, 251, 902; 156/541, 542, DIG. 31, DIG. 33

[56] References Cited

U.S. PATENT DOCUMENTS

| | | | |
|---|---|---|---|
| 1,708,157 | 4/1929 | Spiess | 271/251 |
| 1,963,183 | 6/1934 | Walker | 271/225 |
| 2,622,721 | 12/1952 | Ferguson | 198/787 |
| 2,905,101 | 9/1959 | Sinden | 198/787 X |
| 3,301,733 | 1/1967 | West | 156/542 |
| 3,428,509 | 2/1969 | Messmer | 156/542 |
| 3,616,016 | 10/1971 | Dinter | 156/542 |
| 4,189,337 | 2/1980 | Higgins | 156/541 |
| 4,415,048 | 11/1983 | Teraoka | 53/137 |
| 4,561,921 | 12/1985 | Treiber | 156/542 |
| 4,578,926 | 4/1986 | Sato | 53/137 X |

FOREIGN PATENT DOCUMENTS 2033324 7/1972 Fed. Rep. of Germany ...... 156/542

Primary Examiner—John Sipos
Attorney, Agent, or Firm—Staas & Halsey

[57] ABSTRACT

A system for packaging, weighing and labeling articles has a packaging device and a weighing and labeling device which are disposed parallel to each other. A turn conveyor connects an article outlet of the packaging device to an article inlet of the weighing and labeling device for turning the article substantially through 90 degrees.

14 Claims, 21 Drawing Figures

Fig. I

SYSTEM FOR PACKAGING, WEIGHING AND LABELING ARTICLES

BACKGROUND OF THE INVENTION

The present invention relates to a system for packaging articles, weighing the packaged articles, and applying a label indicative of information dependent on the weight of the weighed articles.

Facilities for packaging articles to be sold in supermarkets employ a system for automatically and continuously packaging articles on trays with films, weighing the articles, and applying to the weighed articles labels on which prices, etc., computed from the weights are printed. This system includes a packaging device for packaging the articles, and a weighing and labeling device for weighing and labeling the articles. The packaged articles are delivered from the packaging device to the weighing and labeling device. For reducing the space for installation of the overall system or for a greater efficiency, a unit for supplying the articles to the packaging device and a unit for picking up the articles delivered from the weighing and labeling device should be located closely to each other for enabling one worker to supply and pick up articles. In the conventional system for packaging, weighing and labeling articles, the packaging device and the weighing and labeling device are disposed parallel to each other, and a turn conveyor is positioned between the outlet of the packaging device and the inlet of the weighing and labeling device for turning the direction of feed of the articles through 180 degrees.

The turn conveyor is generally composed of a number of rollers disposed in a sectorial pattern. Since the inner periphery of the turning path is shorter than the outer periphery thereof, each of the rollers comprises a conical roller which is of a shorter diameter at its inner end so that the speed of feed of the articles, i.e., the peripheral speed of the roller, is lower at the inner periphery of the turning path. Therefore, the articles supplied to the conveyor are conveyed thereby while their orientation with respect to the direction of feed remains the same as that when they are introduced onto the conveyor.

The packaging device is supplied with the articles oriented transversely, i.e., with their trays having longitudinal axes directed perpendicularly to the direction of feed for allowing the films to wrap the articles and to be sealed smoothly. The packaged articles are then discharged transversely from the packaging device onto the turn conveyor. Unless the orientation of the articles is changed, the packaged articles as they are oriented transversely are turned 180 degrees and fed into the weighing and labeling device. In the labeling device, the articles are delivered longitudinally to guard against loss of orientation, i.e., with the longitudinal axes of the trays being oriented in the direction of feed so that the articles can always be fed to a labeling machine at a constant orientation and labeled at a prescribed position thereon. Accordingly, it is necessary to change the articles from the transverse orientation to the longitudinal orientation either when they are transferred from the turn conveyor to the weighing and labeling device, or on the turn conveyor.

It has been conventional practice to provide an abutment member for abutting against one side of the articles which are oriented transversely to hold that side temporarily against movement for thereby changing the orientation of the articles. With this arrangement, however, the abutment member may engage articles differently dependent on the size of the trays and may not turn the articles into the longitudinal orientation. When this happens, labels can not properly be applied to the articles by the labeling machine in the labeling device.

To eliminate the above problem, one solution has been to employ a conveyor device composed of a turn conveyor of a 90-degree arc and a vertical conveyor. In this conveyor device, the vertical conveyor is disposed in overlapping relation to the terminal end of the turn conveyor, the vertical conveyor having a direction of feed normal to the direction of feed of the turn conveyor at its terminal end. When the articles which are oriented transversely are turned 90 degrees by the turn conveyor, they are delivered to the vertical conveyor and discharged thereby in the longitudinal orientation. The conveyor device is advantageous in that the articles introduced transversely onto the turn conveyor are always turned into the longitudinal orientation by the vertical conveyor regardless of the size of the trays and can be picked up in a direction opposite to the direction in which they have been supplied to the turn conveyor. Therefore, labels can uniformly be applied to the articles in the weighing and labeling device. However, since the two conveyors are required, two drive devices are also necessary to drive the respective conveyors. The vertical conveyor also needs a lifting and lowering means for its operation. Accordingly, the structure of the conveyor device is complex and the cost of the overall system is high.

The turn conveyor must have its inlet properly connected to the outlet of the packaging device and its outlet properly connected to the inlet of the weighing and labeling device for smooth delivery of the articles. The distances between the inlets and outlets must be selected as optimum distances dependent on the dimensions of the packaging device and the weighing and labeling device. According to one system layout, the articles as discharged from the packaging device are turned to the right before they are fed into the weighing and labeling device, and according to another system layout, the articles as discharged from the packaging device are turned to the left before they are fed into the weighing and labeling device. Therefore, some systems use a turn conveyor for turning the articles to the right and some systems employ a turn conveyor for turning the articles to the left. As a result, different types of turn conveyors have to be provided for use in packaging, weighing and labeling systems, which are therefore rendered high in cost.

In the weighing device for weighing the articles discharged from the turn conveyor and labeling the weighed articles, the articles have to be fed transversely in constant positional relationship into the labeling machine in order to apply labels properly to the articles irrespectively of the size of the articles. A device therefore would be needed to displace the articles laterally to a prescribed position and feed them to the labeling machine at a constant orientation.

There is known an automatic labeling device for attracting a label issued from a printer against the lower surface of a suction head under the suction produced by a blower and for changing the direction of air flow from the blower to apply the label to an article when the article is positioned below the suction head. Another known automatic labeler includes a suction box for attracting a label, which is attached to the lower end of a labeler rod for movement between an upper label receiving position and a lower label applying position, the suction box being connected to a blower by a bellows hose, as disclosed in Japanese Utility Model Publication No. 57-36571 filed by the present applicant. The former automatic labeling machine is however disadvantageous in that it is difficult to apply labels to articles properly at a prescribed position, resulting in irregularly positioned labels applied to the articles. With the latter automatic labeler, since the suction box is moved to the lower label applying position, labels can be applied to articles at a constant position. However, because the labels are subject to suction through the suction box and the bellows hose even when the labels are applied to the articles, some labels may tend to remain attached to the lower surface of the suction box under the suction, without being applied to the articles, due to the nature of the adhesive coated on the reverse side of the labels or the condition of the surface of the articles where the labels are to be applied.

SUMMARY OF THE INVENTION

It is an object of the present invention to provide a system for packaging, weighing and labeling articles which takes up a reduced installation space and can supply and discharge articles efficiently.

Another object of the present invention is to provide a system for packaging, weighing and labeling articles which has a turn conveyor for automatically turning articles through about 90 degrees from a transverse orientation to a longitudinal orientation, for example, while they are delivered through an arcuate path of a 180 degree arc from a packaging device to a weighing and labeling device.

Still another object of the present invention is to provide a system for packaging, weighing and labeling articles which has a turn conveyor having an article inlet at a starting end thereof and an article outlet at a terminal end, the distance between the article inlet and the article outlet being variable, the article inlet and outlet being switchable around to reverse the direction of turning movement, the turning conveyor being capable of coping with different dimensions of the packaging device and the weighing and labeling device and also with different directions of turning movement of the articles discharged from the packaging device, whereby the turn conveyor and the system are manufacutered at a reduced cost.

A still further object of the present invention is to provide a system for packaging, weighing and labeling articles which has a displacing conveyor device capable of feeding articles to a labeling machine with their one side aligned with a constant position transversely to the direction of feed at all times irrespectively of the weight and size of the articles discharged from a turn conveyor.

A yet still further object of the present invention is to provide a system for packaging, weighing and labeling articles which has a labeling device capable of applying labels to articles properly at a prescribed position at all times.

Still another object of the present invention is to provide a system for packaging, weighing and labeling articles which has a labeling device including a simple arrangement for accurately detecting the timing of label application.

A still further object of the present invention is to provide a system for packaging, weighing and labeling articles which has a weighing machine that will not include the weight of a conveyor motor in its weighing data.

Yet still another object of the present invention is to provide a system for packaging, weighing and labeling articles which has a compact printer in which the casing of a takeup reel drive motor is employed as a guide for the core of a label roll.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
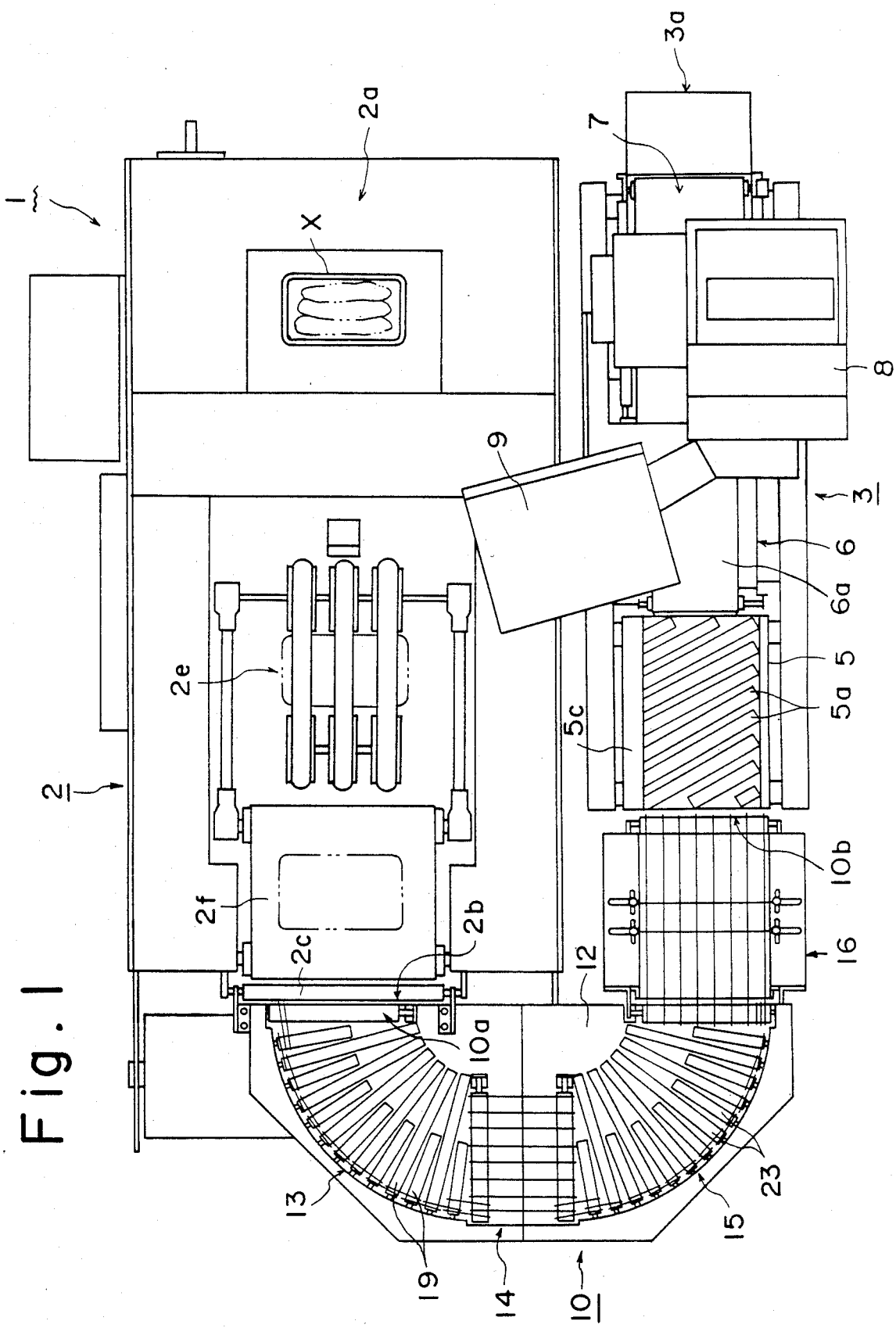
FIG. 1 is a plan view of a system for packaging, weighing and labeling articles according to the present invention.

As shown in FIG. 1, a system 1 for packaging, weighing and labeling articles according to the present invention includes a packaging device 2 and a weighing and labeling device 3 which are arranged in parallel to each other, and a turn conveyor 10 disposed between ends of the devices 2, 3 for turning the direction of feed of the articles through 180 degrees. An article X supplied from an article inlet 2a at one end of of the packaging device 2 is moved to the left through the packaging device 2 to the turn conveyor 10. After the article X has been turned 180 degrees by the turn conveyor 10, the article X is moved to the right through the weighing and labeling device 3 to an article pickup unit 3a at one end of the device 3. Therefore, a U-shaped delivery path is defined through the device 2, the turn conveyor 10, and the device 3.

The packaging device 2 comprises the article inlet 2a, a packaging unit 2e for covering the article X supplied from the article inlet 2a and disposed on a tray with a film applied downwardly, a sealing conveyor 2f for folding the film covering the article X down over the reverse side of the tray, and an article outlet 2b for discharging the packaged article X.

The turn conveyor 10 includes a mount 11 and a base member 12 mounted thereon. The turn conveyor 10 comprises a first turning conveyor section 13 disposed on the base member 12, an intermediate conveyor section 14, a second turning conveyor section 15, and an auxiliary conveyor 16 attached to one side of the base member 12 and projecting from the second turning conveyor section 15 to a displacing conveyor 5. The first turning conveyor section 13 has a starting end serving as an article inlet 10a of the turning conveyor 10 which is connected to the article outlet 2b of the packaging device 2. The auxiliary conveyor 16 has a terminal end serving as an outlet 10b for discharging the article to the weighing and labeling device 3.

Figure 3:
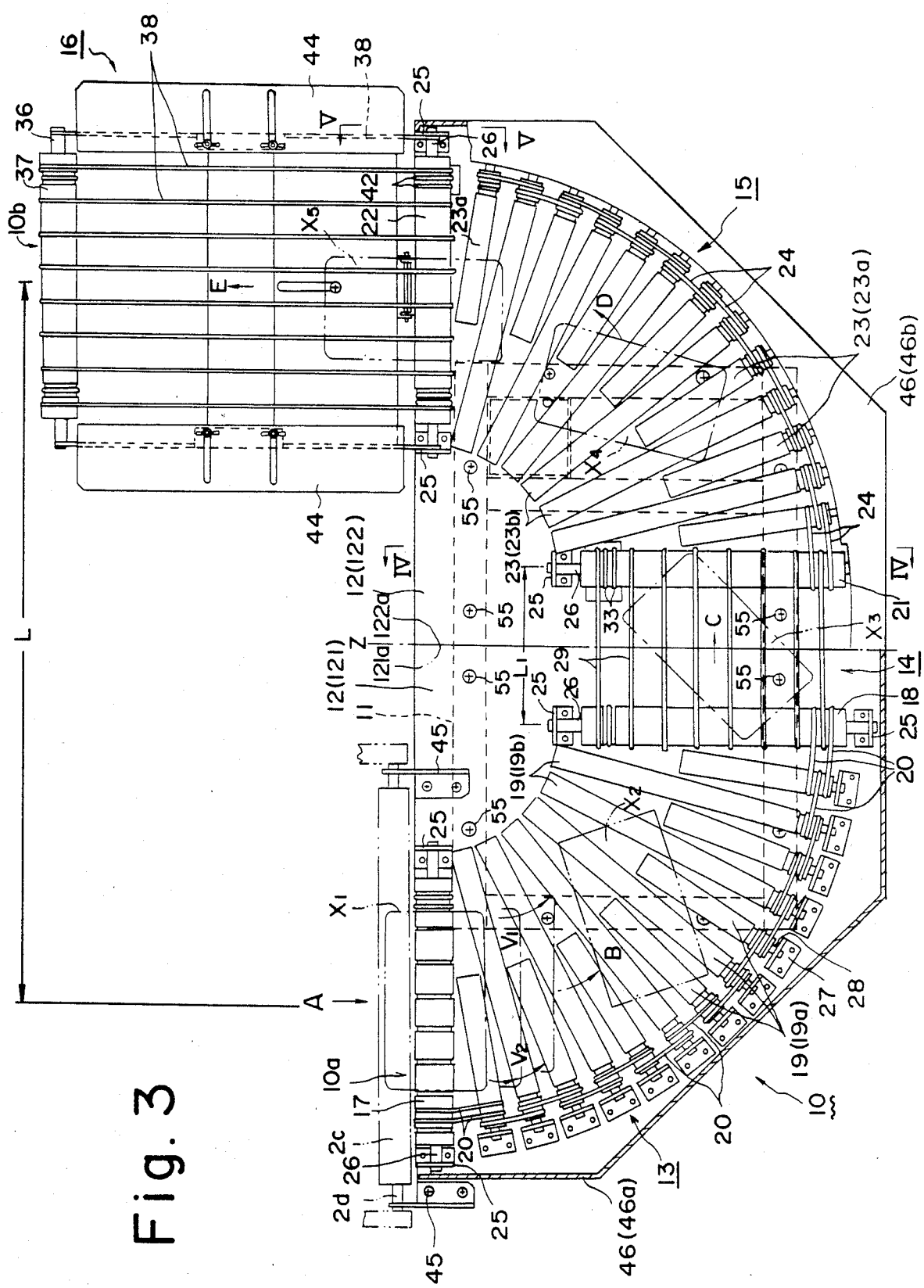
FIG. 3 is an enlarged plan view of a turn conveyor in the system.

As shown in FIG. 3, the first turning conveyor section 13 of the turn conveyor 10 has a first roller 17 positioned parallel and adjacent to an outlet roller 2c in the article outlet 2b of the packaging device 2, a final roller 18 extending perpendicularly to the first roller 17 and serving as a roller at the starting end of the intermediate conveyor section 14, and a plurality of turning rollers 19 disposed in a sectorial pattern between the rollers 17, 18. The rollers 17, 18, 19 have outer ends operatively coupled by ropes 20 each trained around two adjacent rollers. Likewise, the second turning conveyor section 15 has a first roller 21 positioned parallel to the final roller 18 in the first turning conveyor section 13, a final roller 22 extending perpendicularly to the first roller 21 and serving as a roller at the terminal end of the auxiliary conveyor 16, and a plurality of turning rollers 23 disposed in a sectorial pattern between the rollers 21, 22. The rollers 21, 22, 23 have outer ends operatively coupled by ropes 24 each trained around two adjacent rollers. All of the rollers of the first and second turning conveyor sections 13, 15 are cylindrical rollers. The turning rollers 19, 23 comprise alternate shorter and longer rollers 19a, 23a and 19b, 23b, with their outer ends aligned in an arcuate pattern.

The first rollers 17, 21 and the final rollers 18, 22 are rotatably supported by shafts 26 having ends supported by brackets 25 secured to the base member 12. The turning rollers 19, 23 are rotatably supported by shafts 23 supported by brackets 27 in a cantilevered fasion.

Figure 4:
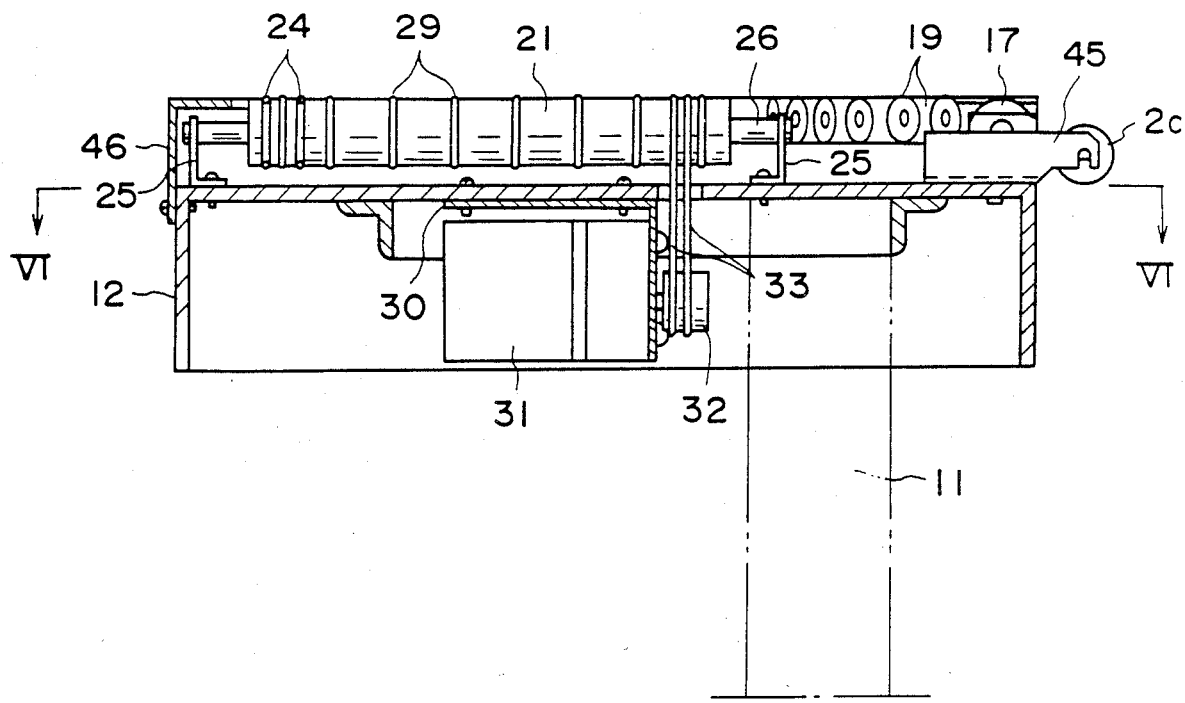
FIG. 4 is a cross-sectional view taken along line IV—IV of FIG. 3.

The intermediate conveyor section 14 includes a plurality of parallel ropes 29 trained around and extending between the final roller 18 of the first turning conveyor section 13 and the first roller 21 of the second turning conveyor section 15. Drive ropes 33 are trained around the roller 21 and a pulley 32 (FIG. 4) on the shaft of a motor 31 fastened to the lower side of the base member 12 by a bracket 30. When the motor 31 is energized, the drive ropes 33 cause the roller 21 to rotate to enable the ropes 29 to run simultaneously. As the roller 18 is rotated by the ropes 29, the turning rollers 19 and the first roller 17 of the first turning conveyor section 13 are also rotated by the ropes 20. As the roller 21 is rotated, the turning rollers 23 of the second turning conveyor section 15 are rotated by the ropes 24. The first turning conveyor section 13 defines a first turning conveyor path of a 90-degree arc in the direction of the arrow B (FIG. 3) following the direction of discharge from the packaging device 2 as indicated by the arrow A, the intermediate turning conveyor section 14 defines an intermediate conveyor path following the first turning conveyor path, and the second turning conveyor section 15 defines a second turning conveyor path of a 90-degree arc in the direction of the arrow D.

The base member 12 of the turn conveyor 10 comprises a first base member 121 at the inlet 10a and a second base member 122 at the outlet 10b, the first and second base members 121, 122 being fastened to the upper surface of the mount 11 by a plurality (six in the illustrated embodiment) of screws 55. The first turning conveyor section 13 is mounted on the first base member 121, the second turning conveyor section 15 is mounted on the second base member 122, and the intermediate conveyor section 14 is disposed across the dividing line z—z of between the base members 121, 122.

Figure 6:
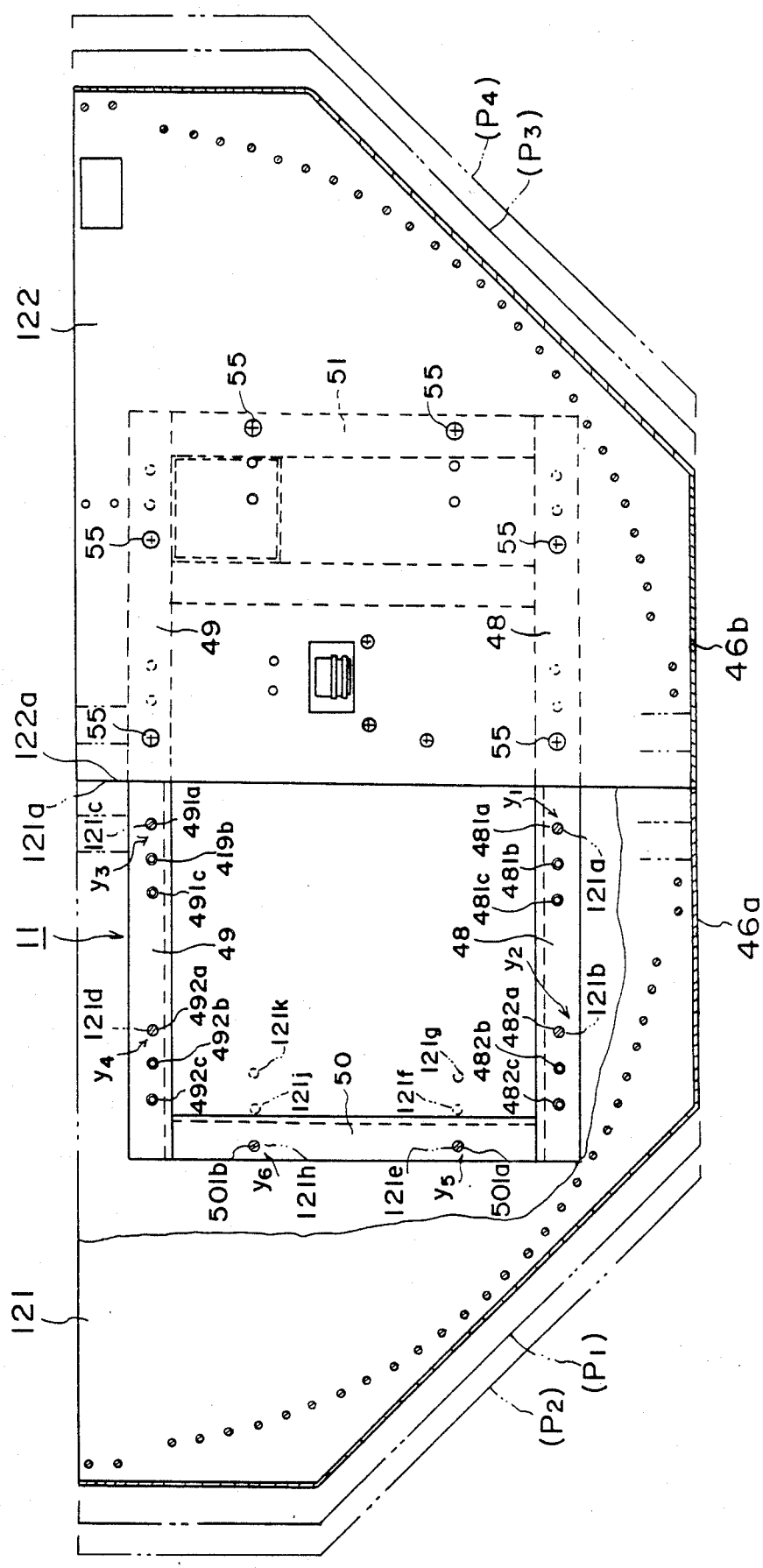
FIG. 6 is a cross-sectional view taken along line VI—VI of FIG. 4.

The first and second base members 121, 122 have edges 121a, 122a held against each other across the dividing line z—z. However, the first and second base members 121, 122 may be fastened to the mount 11 with the edges 121a, 122a spaced a suitable distance from each other. More specifically, as shown in FIG. 6, the mount 11 has an upper portion constructed as a hollow rectangular shape composed of two frame members 48, 49 extending perpendicularly to the dividing line z—z and two frame members 50, 51 extending parallel to the dividing line z—z. The first base member 121 can be fastened to one half of the mount 11, and the second base member 122 can be fastened to the other half by screw fastener means y1 through y6. With respect to the first base member 121, the first and second screw fastener means y1, y2 include three screw holes 481a, 481b, 481c and three screw holes 482a, 482b, 482c, respectively, defined at regular intervals or pitches in the frame member 48 in selective alignment with holes 121a, 121b defined in the base member 121. Similarly, the third and fourth screw fastener means y3, y4 include three screw holes 491a, 491b, 491c and three screw holes 492a, 492b, 492c, respectively, defined at regular intervals or pitches in the frame member 49 in selective alignment with holes 121c, 121d defined in the base member 121. The fifth and sixth screw fastener means y5, y6 include three holes 121e, 121f, 121g and three holes 121h, 121j, 121k, respectively, defined at regular intervals or pitches in the base member 121 in selective alignment with screw holes 501a, 501b defined in the frame member 50.

When the holes 121a, 121b, 121c, 121d of the base member 121 are aligned with the screw holes 481a, 482a, 491a, 492a of the frame members 48, 49, respectively, as shown, the holes 121e, 121h of the base member 121 are aligned with the screw holes 501a, 501b of the frame member 50. Then, the screws 55 are threaded through and into the aligned holes to fasten the first base member 121 to the mount 11 at a position closest to the second base member 122 as indicated by the solid lines. If the base member 121 is displaced to align different holes and screw holes and fastened by the screws 55, the base member 121 is fixed to the mount 11 at a position spaced from the second base member 122 as indicated by the two-dot-and-dash line P1 or P2. Likewise, the second base member 122 may be fixed to the solid-line position or the two-dot-and-dash-line position P3 or P4. Therefore, the first and second base members 121, 122 can be secured to the mount 11 with the edges 121a, 122a being held against or spaced from each other by a selected spacing therebetween.

A cover 46 is disposed on the outer periphery of the turn conveyor 10 and comprises first and second cover members 46a, 46b attached respectively to the first and second base members 121, 122. Thus, the first and second cover members 46a, 46b can be displaced relatively to each other with the respective base members 121, 122. As shown in FIG. 3, a pair of hook members 45 is disposed at the opposite ends of the first roller 17 of the first turning conveyor section 13 at the inlet 10a of the turn conveyor 10. By placing the hook members 45 in engagement with the shaft 2d of the outlet roller 2c, the turn conveyor 10 and the packaging device 2 can be connected to each other in prescribed positional relationship.

Figure 5:
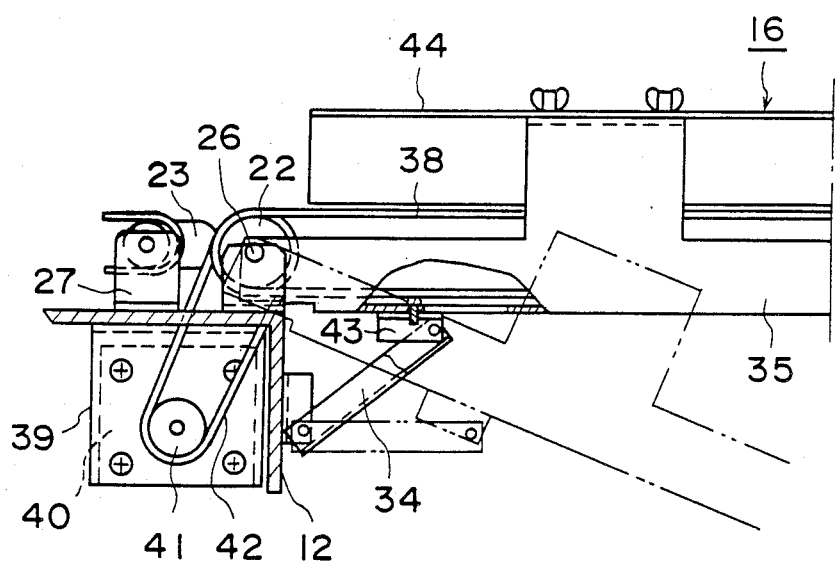
FIG. 5 is a cross-sectional view taken along line V—V of FIG. 3.

As illustrated in FIGS. 3 and 5, the auxiliary conveyor 16 is composed of the final roller in the second turning conveyor section 15, a frame 35 having a front end connected to the ends of the shaft 26 of the roller 22 and supported by a support member 34 on the end of the base member 12, the frame 35 projecting from the base member 12, a roller 37 rotatably supported by a shaft 36 on a projecting end of the frame 35, and a plurality of ropes 38 trained around and between the rollers 22, 37 in parallel relation to each other. The roller 22 is operatively coupled to a pulley 41 on the shaft of a motor 40 fixed by a bracket 39 to the lower surface of the base member 12 by means of drive ropes 42 trained around the roller 22 and the pulley 41. By energizing the motor 40 to rotate the roller 22, the ropes 38 are caused to run for thereby defining a conveyor path in the direction of the arrow E following the conveyor path in the direction of the arrow D in the second turning conveyor section 15. The support member 34 by which the frame 35 is supported is coupled to a slide member 43 slidably attached to the lower surface of the frame 35. By sliding the slide member 43, the overall auxiliary conveyor 16 can be turned up and down about the shaft 26 of the roller 22 as shown in FIG. 5 so that the terminal end of the conveyor 16, i.e., the outlet 10b of the turn conveyor 10, can be aligned at height with the starting end of the displacing conveyor 5 of the weighing and labeling device 3. A pair of guide members 44 is attached to the opposite sides of the frame 35 and adjustable in the distance therebetween. The auxiliary conveyor 16 is drivable by the motor 40 in the illustrated embodiment. However, the motor 40 may be dispensed with, and the rollers 23a, 22 may be operatively coupled by ropes trained around the roller 22 and the turning roller 23a adjacent to the roller 22.

The turn converyor 10 thus constructed operates as follows:

When the article X is supplied, with its tray having a longitudinal axis directed transversely to the direction of feed, to the article inlet 2a of the packaging device 2 as shown in FIG. 1, the article X is fed from the inlet 2a to the packaging unit 2e in which the article X is wrapped by a film and delivered to the sealing conveyor 2f on which the film is folded over the reverse side of the tray and is thermally fused by a heat source (not shown) disposed below the sealing conveyor 2f. The article X is now completely packaged and sealed and discharged from the outlet 2b of the packaging device 2. The article X as discharged is oriented in the same transverse disposition as the orientation at the time it was supplied to the packaging device 2.

Then, the article X is transferred in its transverse orientation to the turn conveyor 10, and is progressively turned through 180 degrees as it travels through the conveyor sections 13, 14, 15. Since the turning rollers 19, 23 arranged in the sectorial patterns in the first and second turning conveyor sections 13, 15 are in the form of cylindrical rollers, the article X as it pass through the conveyor sections 13, 15 is turned thereby to change its orientation with respect to the direction of feed from the transverse to the longitudinal orientation.

More specifically, as indicated by the reference character X1, the article X is first fed in its transverse orientation into the first turning conveyor section 13 in which the article X is placed on the first roller 17 or shorter and longer turning rollers 19a, 19b following the first roller 17. Inasmuch as these turning rollers 19a, 19b, which are cylindrical rollers, have equal peripheral speeds v1, v2 at their inner and outer ends, the orientation of the article X with respect to the direction B of feed is progressively changed as indicated by X2. When the article X reaches the intermediate conveyor section 14 as indicated by X3, the orientation of the article X is tilted about 45 degrees with respect to the direction C of feed. While then passing through the second turning conveyor section 15, the article X is further turned 45 degrees through the position indicated by X4. As a result, when the article X is delivered from the second turning conveyor section 15 to the auxiliary conveyor 16 after having been conveyed through the 180-degree arc, the article X is turned about 90 degrees as indicated by X5 from the transverse orientation to the longitudinal orientation. The article X is then transferred in such longitudinal orientation to the auxiliary conveyor 16. The arcticle X can smoothly be turned or changed in its orientation as the shorter rollers 19a, 23a and the longer rollers 19b, 23b are spaced at close intervals.

In order for the article X to be smoothly transferred from the packaging device 2 to the turn covneyor 10 and from the turn conveyor 10 to the weighing and labeling device 3, the inlet 10a of the turn conveyor 10 and the outlet 2b of the packaging device 2, and the outlet 10b of the turn conveyor 10 and the inlet 3b of the weighing and labeling device 3 have to be aligned in their height as well as in a horizontal plane. The distance between the outlet 2b of the packaging device 2 and the inlet 3b of the weighing and labeling device 3 tend to vary dependent on the dimensions of these devices. In the turn conveyor 10, however, the base member 12 on which the rollers in the conveyor sections 13, 14, 15 are disposed is separated into the first base member 121 at the inlet 10a and the second base member 122 at the outlet 10b, and the base members 121, 122 may be attached to the mount 11 with their edges 121a, 122a either held against each other or spaced from each other by a selectable spacing therebetween. Therefore, the distance L between the inlet 10a and outlet 10b of the turn conveyor 10 can be adjusted to meet the distance between the outlet 2b of the packaging device 2 and the inlet 3b of the weighing and labeling device 3. When the distance L is varied, the distance between the final roller 18 of the first turning conveyor section 13 and the first roller 21 of the second turning conveyor section 15 is also varied to result in a change in the distance L1 of feed across the intermediate conveyor section 14 between the rollers 18, 21. Inasmuch as the rollers 18, 21 are operatively coupled together by the ropes 29, the change in the distance L1 can easily be effected simply by changing the length of the ropes 29. For providing the ropes 29, a plurality of thermally fusible ropes prior to being spliced into an endless shape are employed, After the base members 121, 122 have positionally been adjusted, the ropes are trained around the rollers 18, 21 and then thermally spliced end to end under desired tension. In this manner, the desired distance L1 of the intermediate conveyor section 14 can be achieved to meet the distance L between the inlet 10a and outlet 10b of the turn conveyor 10, i.e., the relative positional relationship of the first and second base members 121, 122. Consequently, the turn conveyor 10 can always smoothly convey the article X irrespective of the size and dimensions of the packaging device 2 and the weighing and labeling device 3.

With the aforesaid construction, the first and second base members 121, 122, the first and second turning conveyor sections 13, 15, and the intermediate conveyor section 14 are symmetrical with respect to the dividing line z—z of the base member 12. Therefore, the second base member 122 may be converted to an inlet side and the first base member 121 to an outlet side by attaching the auxiliary conveyor 16 to the first base member 121, attaching the hook members 45, 45 to the second be member 122, and reversing the direction of rotation of the motor 34. The turn conveyor 10 can thus be employed to feed the article discharged from the packaging device through a rightward 180-degree turn to the weighing and labeling device.

The weighing and labeling device 3 will hereinafter be described. The weighing and labeling device 3 is composed of the displacing conveyor 5 connected to the auxiliary conveyor 16, a weighing machine 6 having a weighing conveyor 6a connected to the displacing conveyor 5, a labeling conveyor 7 connected to the weighing conveyor 6a, a labeling machine 8 disposed above the labeling conveyor 7, and a control box 9.

Figure 7:
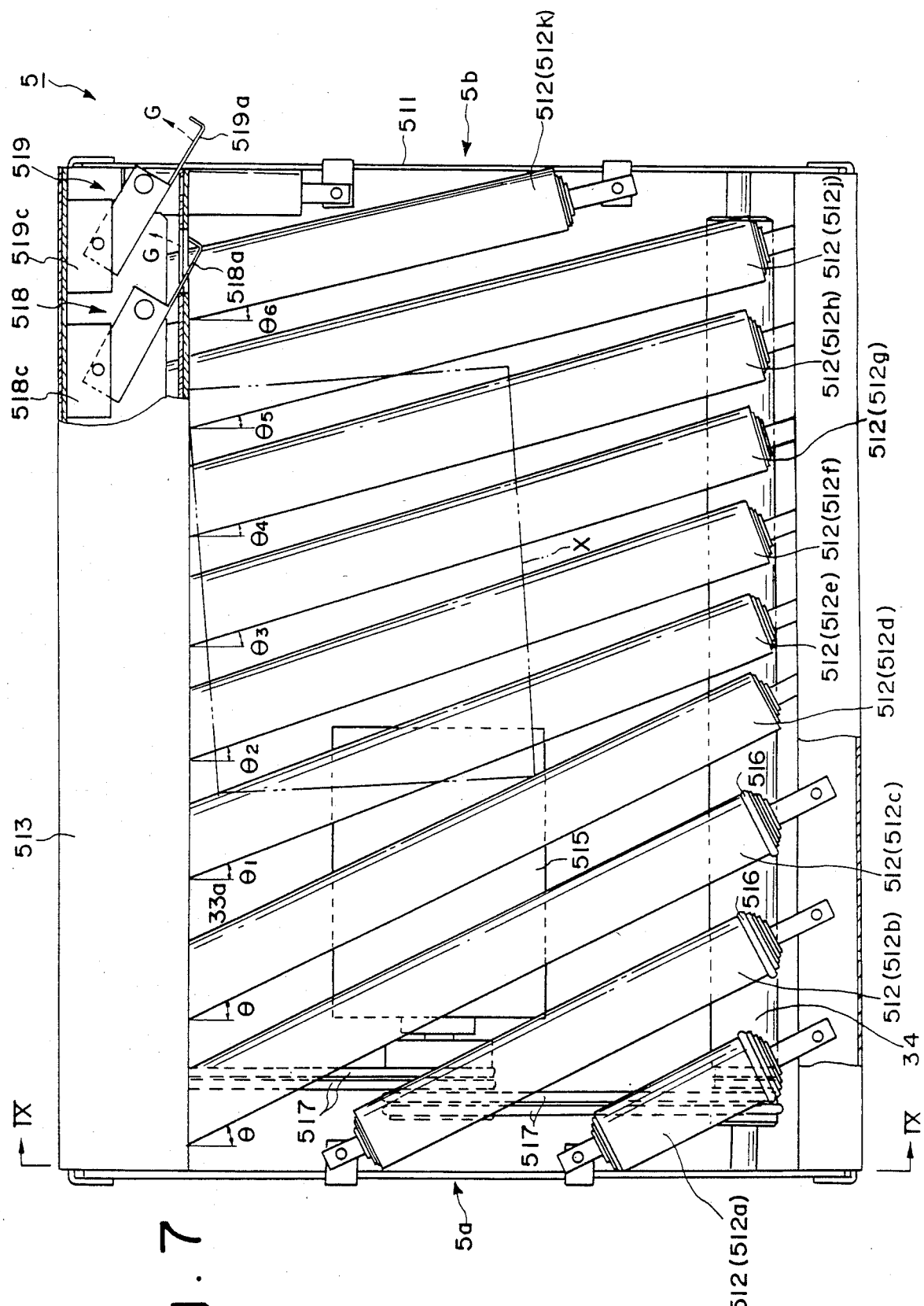
FIG. 7 is an enlarged plan view of a displacing conveyor device in the system.
Figure 8:
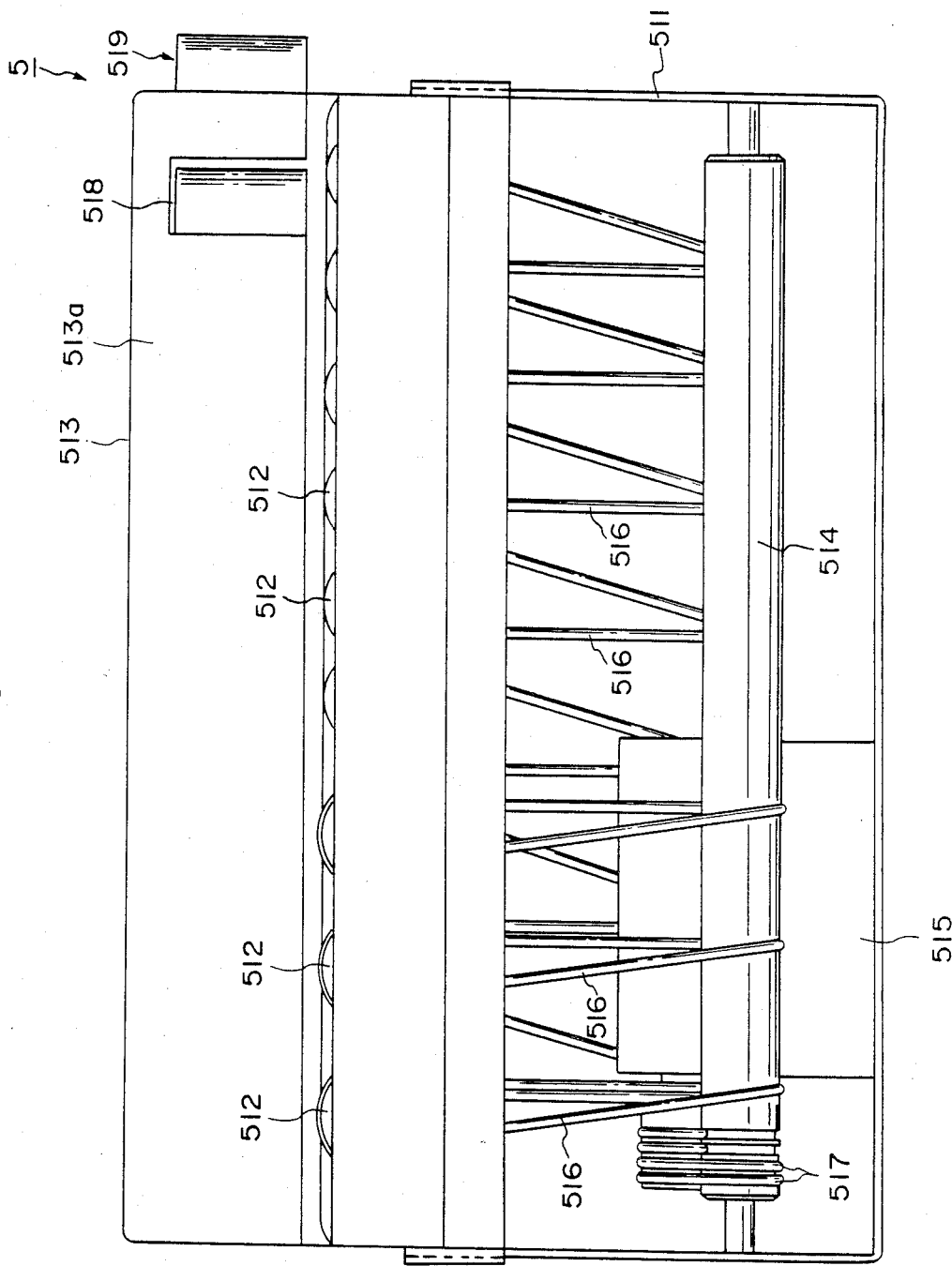
FIG. 8 is an enlarged side elevational view of the displacing conveyor device.
Figure 9:
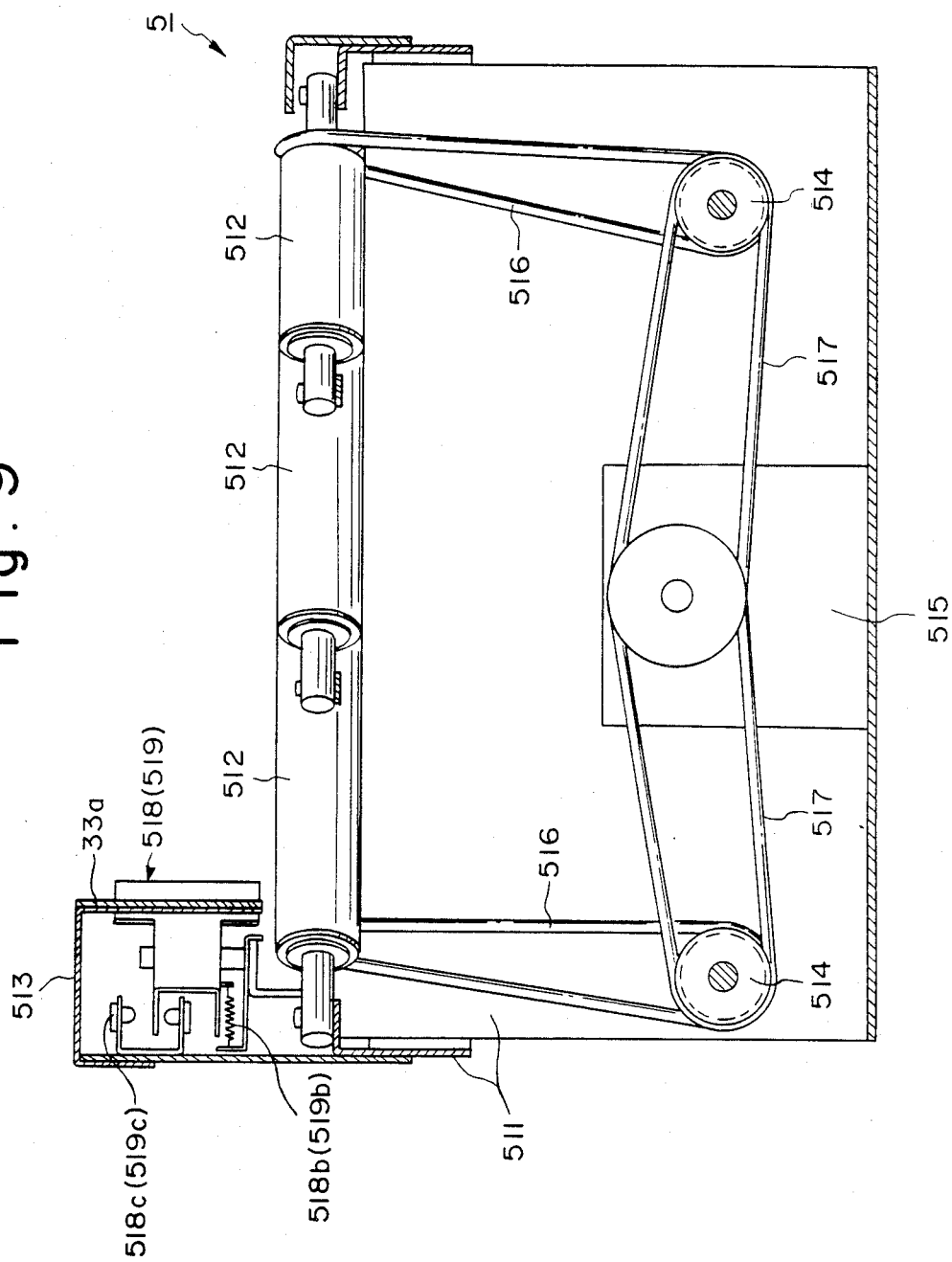
FIG. 9 is a cross-sectional view taken along line IX—IX of FIG. 7.

As illustrated in FIGS. 7 through 9, the displacing conveyor 5 has a plurality of rollers 512 mounted obliquely on the upper surface of a channel-shaped frame 511, and a guide member 513 fixed to the frame 511 and extending along one side thereof. Among the rollers 512, some (four in the illustrated embodiment) rollers 512a, 512b, 512c, 512d located at a starting end 5a of the displacing conveyor 5 have a constant angle of inclination with respect to the direction normal to the guide member 513. Other (six in the illustrated embodiment) rollers 512e, 512f, 512g, 512h, 512j, 512k located at the terminal end 5b of the conveyor 5 are inclined at progressively smaller angles $\theta 1, \ldots \theta 6$ with respect to the direction normal to the guide member 513 than the angle $\theta$. Two parallel intermediate rollers 514 and a motor 515 are disposed below the frame 511. Belts 516 are trained around the intermediate rollers 514 and the rollers 512, and belts 517 are trained around the intermediate rollers 514 and the motor 515. Therefore, the rollers 512 can be rotated simultaneously by the motor 515 through the belts 517, the intermediate rollers 514, and the belts 516. Two sensors 518, 519 positioned at the terminal end 5b of the displacing conveyor 5 comprise swing members 518a, 519a projecting from the guide surface 513a of the guide member 513 and photosensors 518c, 519c attached to the guide member 513. When the swing members 518a, 519a are turned the direction of the arrow G against the forces of springs 518b, 519b by an article moving along the guide surface 513a, such turning movment of the swing members 518a, 519a can be detected by the photosensors 518c, 519c.

With the rollers 512 extending obliquely in the displacing conveyor 5, the article X is fed obliquely forward from the starting end 5a by the rollers 512 as they rotate and is moved into abutment against the guide member 513 located at one side of the direction of feed. If the rollers 512 were excessively inclined to the direction of feed, then the article X would forcibly impinge on the guide member 513 at a large angle. Where the article X is a light article or localized in the tray so that the entire center of gravity is localized, the article would then be bounced from the guide member 513 and would be fed along in an undesired disposition. Therefore, the article would be delivered in an undsired orientation from the terminal end 5b to the weighing machine 6. If the inclination of the rollers 512 were too small to avoid the above difficulty, then the article would not be sufficiently displaced lateraly in the direction normal to the guide member 513 and might not engage the guide member 513. With the disclosed displacing conveyor 5, however, the front rollers 512a, 512b 512c, 512d are inclined at a relatively large angle $\theta$, and the rear rollers 512e, 512f, 512g, 512h, 512j, 512k are inclined at angles $\theta 1$-$\theta 6$ which are progressively smaller than the angle $\theta$. Consequently, the article X can sufficiently be displaced toward the guide member 513 by the front rollers 512a through 512d, and are caused to slide smoothly against the guide surface 513a of the guide member 513 while being fed fowardly along the guide surface 513a as indicated by the two-dot-and-dash lines in FIG. 7. In case the article X is lightweight, therefore, it will not be disturbed in its orientation upon engagement with the guide member 513 and can be fed along longitudinally with one side laterally positioned accurately by the guide member 513 toward the weighing machine 6 or the labeling machine 8. Even if the trays are different in dimensions, one side of the articles X can be aligned with a prescribed position at all times. The illustrated displacing conveyor 5 is not required to have its longitudinal dimensions increased since the angle $\theta$ of inclination of the rollers 512a through 512d near the starting end 5a is relatiely large for enabling the article X to be displaced reliably against the guide member 513.

The laterally positioned article X is then fed into the weighing machine 6 and weighed by the weighing conveyor 6a. The measured weight is applied as an electric signal to the labeling machine 8, in which the price is determined from the unit price (price per unit weight) and the tare weight entered in advance from the control box 9, and the price, weight, unit price, and other letters and numerals are printed by a printer on a label. During that time, the article X is transferred from the weighing conveyor 6a to the labeling conveyor 7. When the article X passes below the labeling machine 8, the printed label is applied to the article X. At this time, the label is applied to the article X at a desired position since the article X has been laterally positioned by the displacing conveyor 5.

Figure 2:
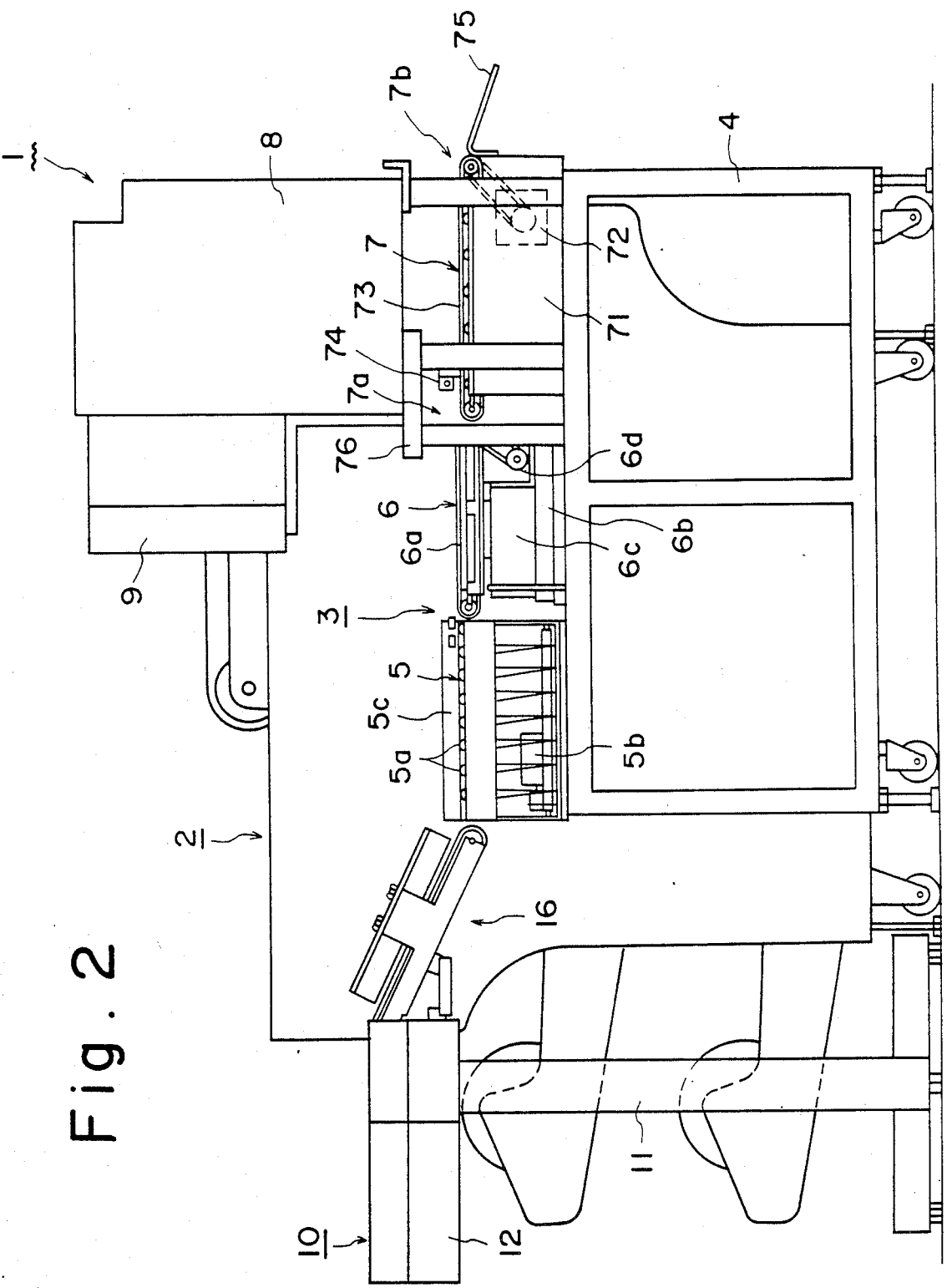
FIG. 2 is a side elevational view of the system shown in FIG. 1.

The weighing machine 6 will be described below. As shown in FIG. 2, the weighing machine 6 has a load cell 6c mounted on a base 6b, and the weighing conveyor 6a having a drive motor 6d is disposed on the load cell 6c. The load is imposed by the weighing conveyor 6a and the article placed on the weighing conveyor 6a on the load cell 6c. The labeling conveyor 7 disposed downstream of the weighing machine 6 has a belt 73 drivable by a motor 72 mounted in a frame 71. A photosensor 74 for detecting the delivery of the article onto the labeling conveyor 7 is disposed in the vicinity of the starting end of the labeling conveyor 7. An inclined discharge plate 75 is fixed to the frame 71 at the terminal end 7b of the labeling conveyor 7.

Above the labeling conveyor 7 on the base 4, the labeling machine 8 and the control box 9 are supported by a support table 76. The labeling machine 8 serves to apply a label on which the price, the unit price, the weight, and other data are printed to the article traveling on the labeling conveyor 7.

The sensor 519 positioned at the terminal end 5b of the displacing conveyor 5 detects the passage of the article X. Upon elapse of a certain time after the detection of the article X, that is, when the article X is positioned on the weighing conveyor 6a, the conveyor 6a is stopped to allow the weighing machine 6 to accurately weigh the article as it is at rest. The sensor 518 positioned upstream of the sensor 519 detects the passage of an article X while the preceding article X is placed on the weighing conveyor 6a as discriminated by a signal from the weighing machine 6, whereupon the displacing conveyor 5 is immediately stopped to prevent the weighing machine 6 from weighing two articles at the same time. The sensor 74 at the starting end 7a of the labeling conveyor 7 serves to detect the passage of the article and supply a signal to the labeling machine 8 for enabling the labeling machine 8 to apply a label to the article at a prescribed longitudinal position thereon.

Figure 10:
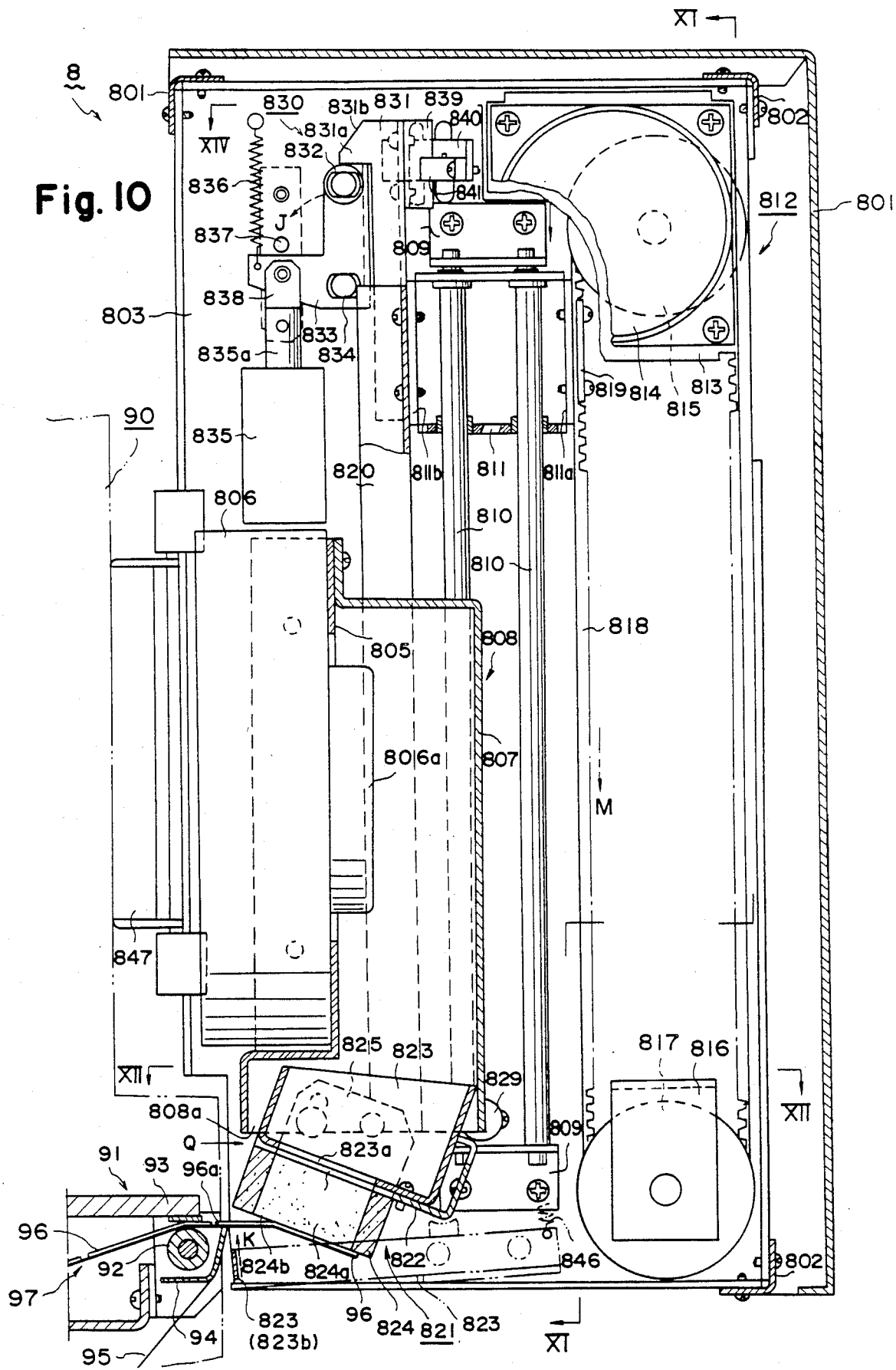
FIG. 10 is a vertical cross-sectional view of a labeling machine.
Figure 11:
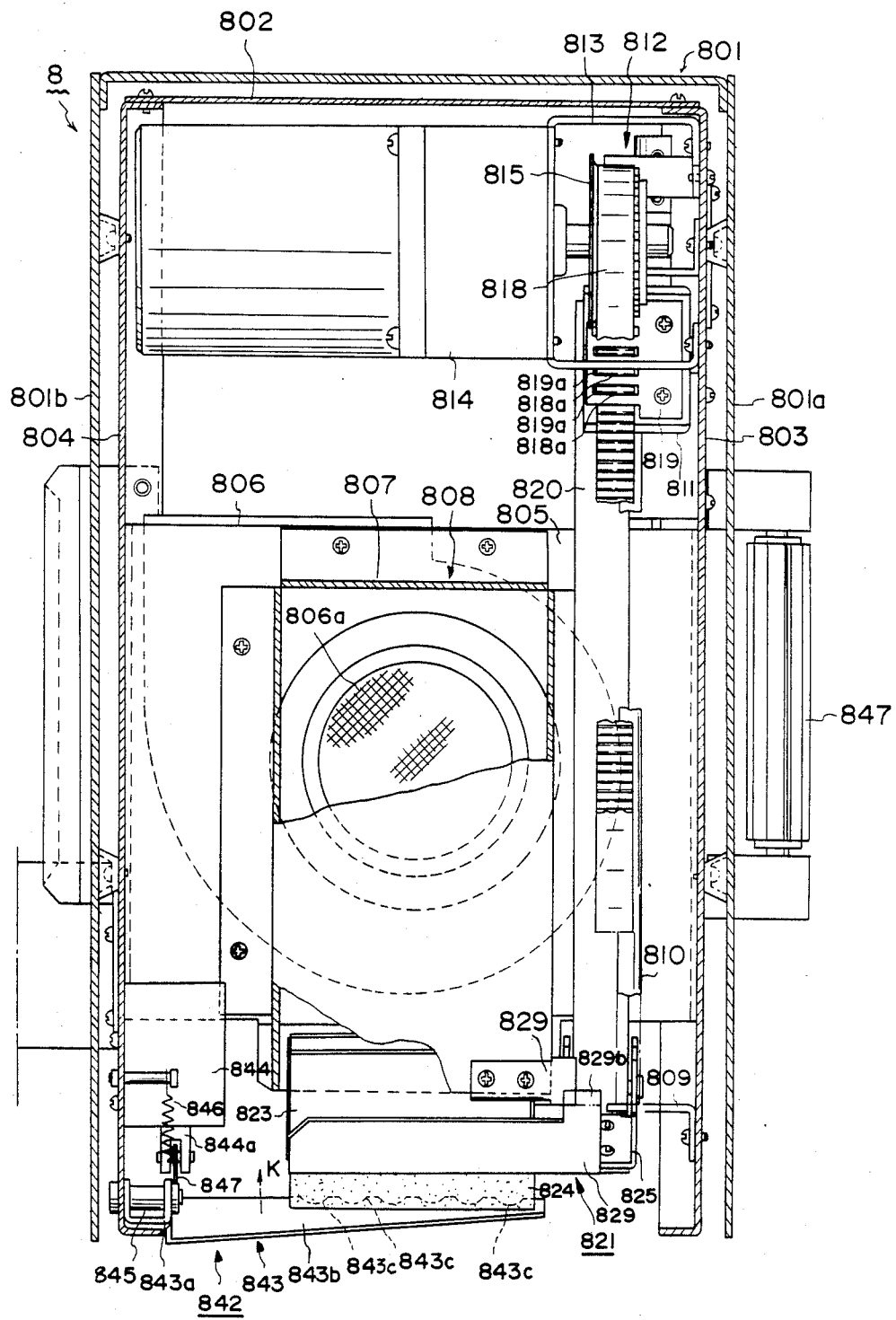
FIG. 11 is a cross-sectional view taken along line XI—XI of FIG. 10.
Figure 12:
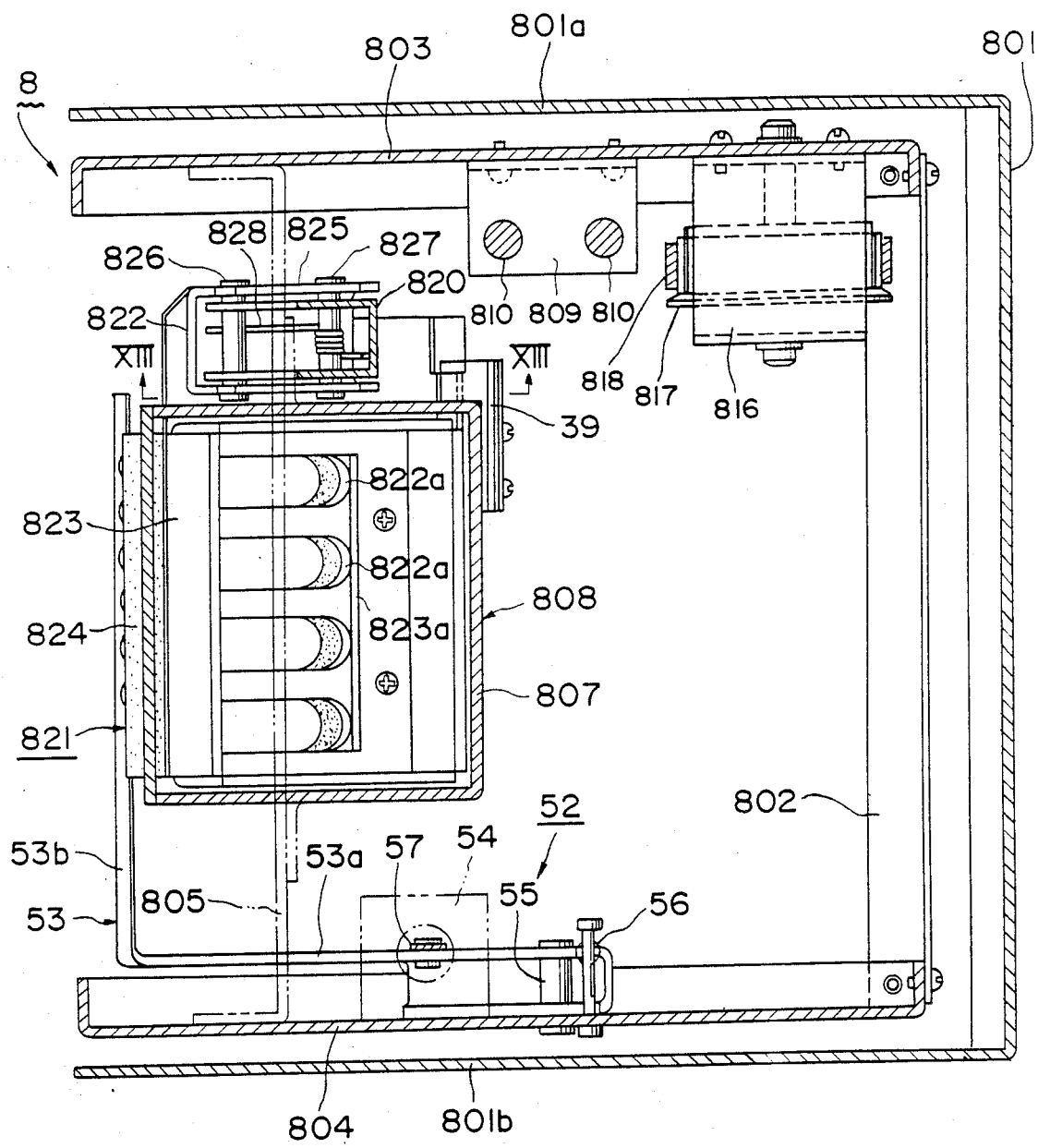
FIG. 12 is a cross-sectional view taken along line XII—XII of FIG. 10.

The labeling machine 8 will be described with reference to FIGS. 10 through 17. As shown in FIGS. 10 and 11, the labeling machine 8 has a cover 801 having open front (leftward in FIG. 10) and lower sides, and first and second parallel frames 803, 804 fixed to the sides 801a, 801b of the cover 801 and coupled by a plurality of stays 802. Various components are disposed between the frames 803, 804.

More specifically, a blower base 805 is supported between the frames 803, 804 at their front portion, and a blower 806 is attached to the front surface of the blower base 805. An intake cover 807 is mounted on the rear surface of the blower base 805 and cooperates with the blower base 805 in forming an intake box 808 having an open lower end. The blower 806 has an intake port 806a projecting into the intake box 808 for drawing air from the intake box 808.

Two guide shafts 810 are vertically supported at their vertical ends by L-shaped brackets 809 on the inner surface of the first frame 803. A box-shaped slide member 811 is vertically slidably fitted over the guide shafts 810. A drive mechanism 812 for vertically moving the slide member 811 is positioned behind the slide member 811. The drive mechanism 812 has a motor 814 mounted by a bracket 813 on the rear upper portion of the first frame 803, a driver pulley 815 fixed to the shaft of the motor 814, a driven pulley 817 rotatably supported by a bracket 816 on the rear lower portion of the first frame 803, and a belt 818 trained around the driver and driven pulleys 815, 817. The belt 818 is gripped between the rear surface 811a of the slide member 811 and a grip member 819 fixed to the rear surface 811a. Upon rotation of the motor 814, the belt 818 runs vertically to move the slide member 811 downwardly from the illustrated upper limit or upwardly from the lower limit along the guide shafts 810. The belt 818 comprises a toothed belt. The grip member 819 which holes the belt 818 on its toothed surface has slits 819a in which some teeth 818a of the belt 818 engage. Therefore, the grip member 819 or the slide member 811 and the belt 818 are reliably coupled together. The motor 814 comprises a torque motor which is stopped when the drive reactive force is in excess of a certain limit.

Figure 13:
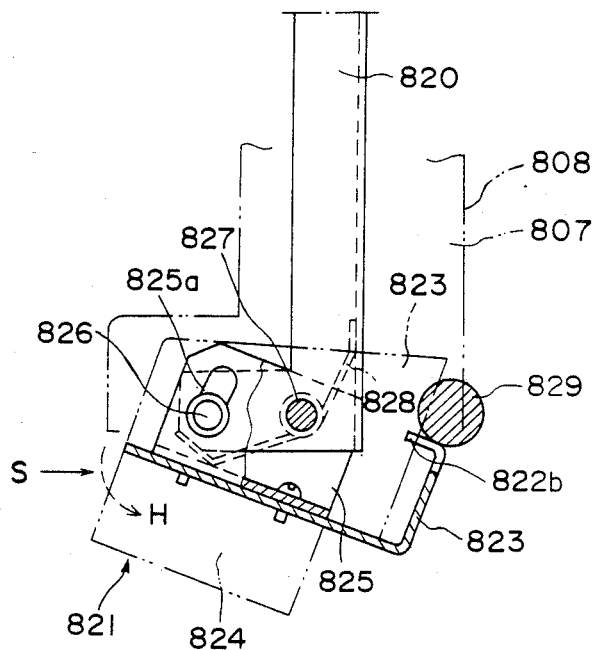
FIG. 13 is a cross-sectional view taken along line XIII—XIII of FIG. 12.

A vertical arm 320 has an upper end fixed to the front surface 811b of the slide member 811 and a lower end to which a suction head 821 is attached. Upon vertical movement of the slide member 811, the suction head 821 is moved vertically by the vertical arm 820. When in the illustrated limit position Q for receiving a label, the suction head 821 closes the lower opening 808a of the intake box 808. As shown in FIGS. 11 through 14, the suction head 821 includes a base plate 822 having a plurality of slits 822a, a suction box 823 fixed to the upper surface of the base plate 822 and having an opening 823a defined in the bottom thereof and communicating with the slits 822a, the suction box 823 opening upwardly, a damper member 824 as of sponge fixed to the lower surface of the base plate 822 and having a plurality of intake holes 824a registered with the slits 822a, and a channel-shaped coupling member 825 fixed to one side of the upper surface of the base plate 822. As shown in FIG. 13, the coupling member 825 is joined to the lower end of the arm 820 by two front and rear pins 826, 827. The front pin 826 is inserted through an oblong hole 825a defined in each of the sides of the coupling member 825. Therefore, the coupling member 825 or the overall suction head 821 can be tilted about the rear pin 827 in the direction of the arrow H with respect to the arm 820. The coupling member 825 or the suction head 821 is normally urged in the direction of the arrow H by a spring 828 fitted over the rear pin 827 and having one end retained by the coupling member 825 and the opposite end by the arm 82. When the suction head 821 is in the label receiving position Q as illustrated, a projection 822b on the rear end of the base plate 822 is held against a stopper 829 fixed to the lower portion of the intake cover 827 for thereby keeping the suction head 821 in a tilted position with its front end raised against the resiliency of the spring 828.

Figure 14:
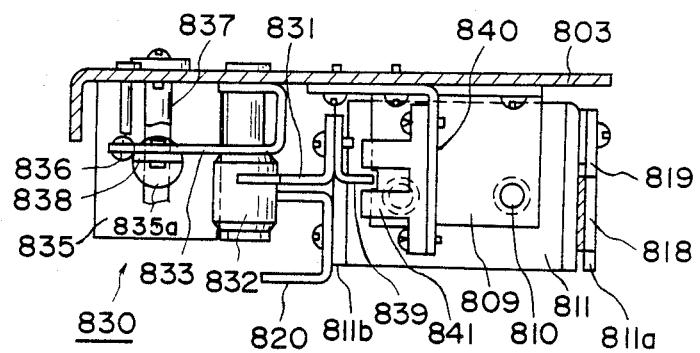
FIG. 14 is a cross-sectional view taken along line XIV—XIV of FIG. 10.
Figure 15:
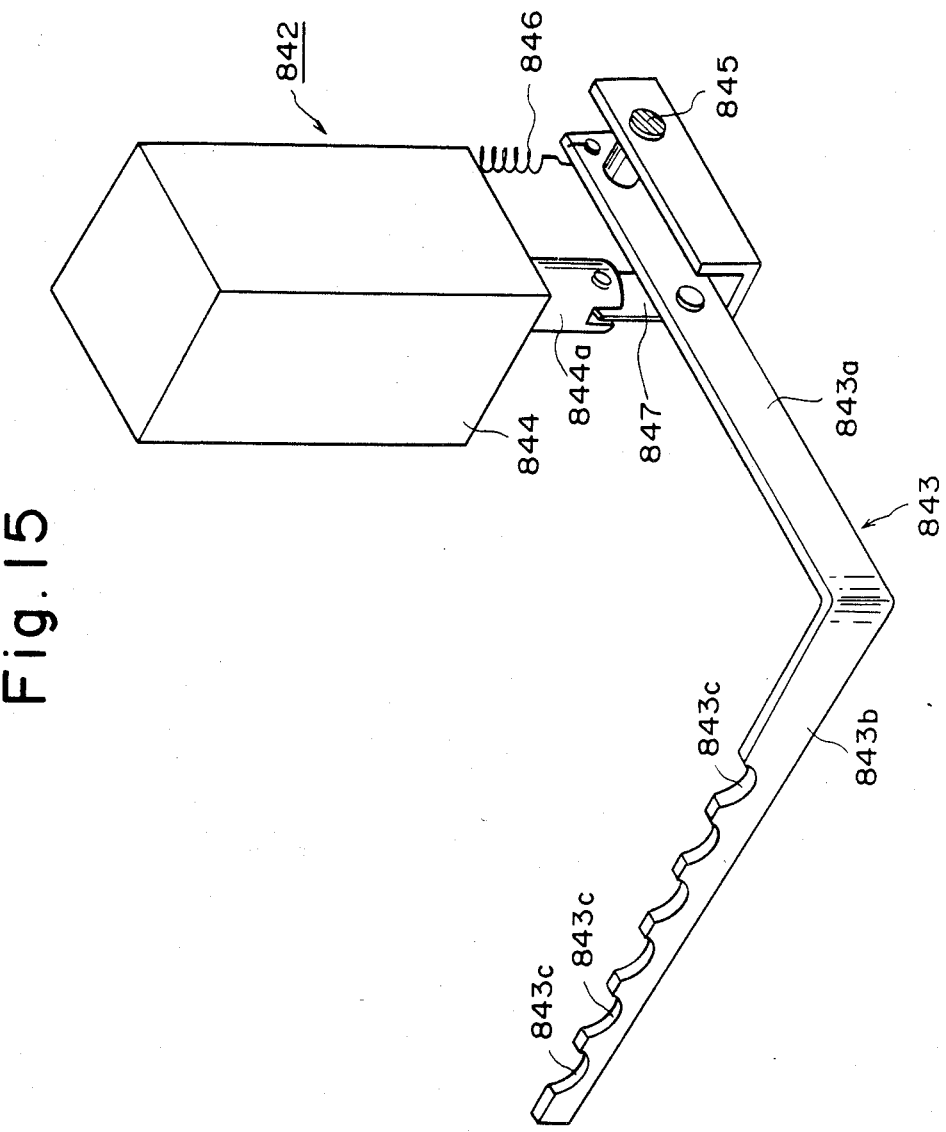
FIG. 15 is a perspective view of a label peeling mechanism in the labeling machine.

As shown in FIGS. 10 and 14, a latch mechanism 830 is mounted on the front surface 811b of the slide member 811 for holding the suction head 821 through the slide member 811 and the arm 820 in the label receiving position Q. The latch mechanism 830 comprises a latch 831 fixed to the slide member 811, an L-shaped latch lever 833 having on its disl end a roller 832 engageable with a hooked portion 831a projecting fowardly from the upper end of the latch 831, and a solenoid 835 for turning the lever 833 about a shaft 834 from the position of FIG. 10 in the direction of the arrow J. When the solenoid 835 is deenergized, the latch lever 833 is held in engagement with a stopper 837 under the bias of a spring 836 as illustrated. In this position, the roller 832 on the distal end of the lever 833 engages upwardly the hooked portion 831a of the latch 831. Upon energization of the solenoid 835, the plunger rod 835a of the solenoid 835 is moved downwardly to cause a link 838 to turn the latch lever 833 in the direction of the arrow J. The roller 832 is now disengaged from the latch 831 to allow the latch 831 or the slide member 811, the arm 820, and the suction head 821 to move downwardly. A shutter 839 is fixed to the rear surface of the latch 831, and a photosensor 841 is secured to the first frame 803 by an L-shaped bracket 840. When the latch 831 is in the illustrated position (the suction head 821 is in the label receiving position Q), the shutter 839 cuts off light from the light-emitting element toward the lightdetector in the photosensor 841, which then issues a signal indicating that the suction head 821 is in the label receiving position Q. The bracket 840 and the photosensor 841 are vertically adjustably attached to the first frame 803.

The labeling machine 8 also includes a label peeling mechanism 842. As shown in FIGS. 10, 11, 12 and 15, the label peeling mechanism 842 has an L-shaped separation member 843 composed of an arm 843a extending along the lower end of the second frame 804 and a label lifting portion 843b extending at a right angle from the front end of the arm 843a and extending transversely below the front portion of the suction head 821, and a solenoid 844. The arm 843a has a rear end pivotally coupled by a shaft 845 to the lower end of the second frame 804 for allowing the label lifting portion 843b to turn upwardly from the position of FIGS. 10 and 11 in the direction of the arrow K. The label lifting portion 843b is normally urged to move downwardly by a spring 846 connected between the rear end of the arm 843a and the second frame 804. The solenoid 844 has a plunger rod 844a coupled by a link 847 to the arm 843a. When the solenoid 844 is energized, the plunger rod 844a is moved upwardly to raise the label lifting portion 843b. In the illustrated embodiment, the label lifting portion 843b has a number of recesses 843c defined in the upper edge thereof.

The labeling machine 8 of the above construction is attached to a printer 90 with the front face of the labeling machine 8 facing the printer 90. In this position, the suction head 821 in the label receiving position Q is located closely to a label issuing unit 91. The labeling machine 8 is coupled by a hinge 847 to the printer 90 so that the labeling machine is angularly movable to move the front face thereof away from the printer 90. The label issuing unit 91 includes a platen roller 92, a print head 93 held against the platen roller 92, and a peeling member 94 disposed in front of the platen roller 92 closely to the suction head 821. When a label sheet 97 composed of a base sheet 95 and a number label 96 applied thereto is passed between the platen roller 92 and the print head 93, the print head 93 prints required letters and numerals on each of the labels 96. The printed label 96 can be peeled off the base sheet 95 and move on as the base sheet 95 is turned downwardly through a sharp angle around the peeling member 94. The lower surface 824b of the damper member 824 in the suction head 821 is positioned, as inclined, in the direction in which the peeled label 96 advances.

Operation of the labeling machine 8 will be described below.

While the suction head 821 is in the label receiving position Q, a printed label 96 is discharged from the label issuing unit 91. The label 96 issued from the label issuing unit 91 is then engaged by the inclined lower surface 824b of the damper member 824 and moves therealong with the adhesive-coated surface facing downwardly. At this time, the lower opening 808a of the intake box 808 is closed by the suction head 821, and air is drawn from the intake box 808 by the blower 806. Therefore, a vacuum is developed in the intake box 808 and acts as a suctioning force on the label 96 through the slits 822a of the base plate 823, the intake holes 824a of the damper member 824, and the lower surface 824b thereof, thereby holding the label 96 against the lower surface 824b of the damper member 824.

Figure 16:
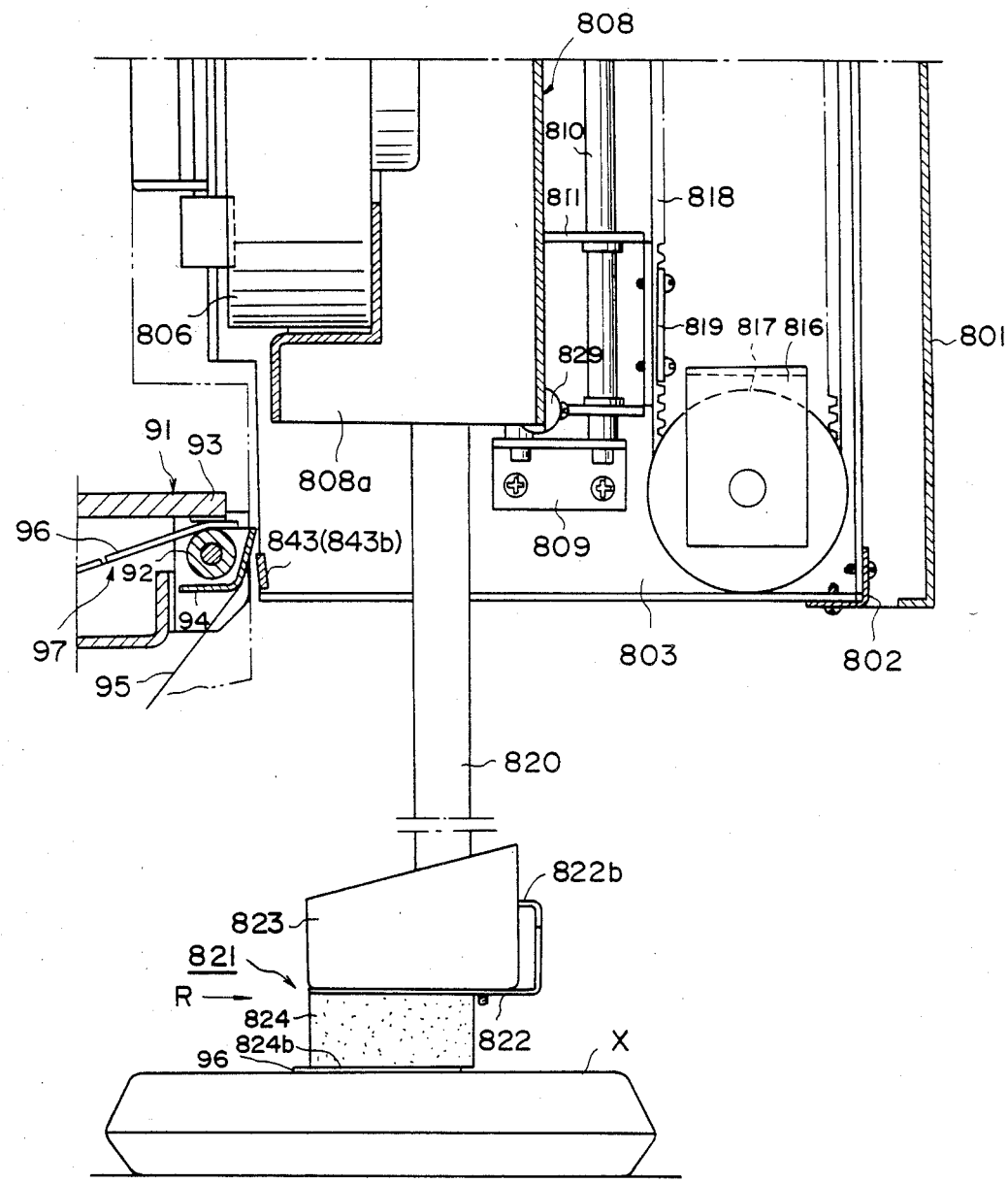
FIG. 16 is an enlarged fragmentary vertical cross-sectional view showing the manner in which a label is applied.

Then, the solenoid 835 of the latch mechanism 830 is energized to turn the latch lever 833 in the direction of the arrow J from the position of FIG. 10 for thereby releasing the roller 832 from the hooked portion 831a. Thereafter, the motor 814 of the drive mechanism 812 is rotated in a prescribed direction to cause the belt 818 to run in the direction of the arrow M. The slide member 811 coupled to the belt 818 is slid downwardly as it is guided by the guide shafts 810 to lower the arm 820 connected at its upper end to the slide member 811 and the suction head 821 coupled to the lower end of the arm 820 to a label applying position R (FIG. 16). As shown in FIG. 16, the label 96 held against the lower surface 824b of the suction head 821 (damper member 824) is then pressed against the upper surface of the article X disposed below the labeling machine 8. The label 96 is now applied to the article 8 by the adhesive coated on the lower surface thereof. The downward movement of the suction head 821 opens the lower opening 808a of the intake box 808 to reduce the suction therein. As the suction head 821 is moved away from the intake box 808, the suction on the label 96 against the lower surface 824b is lowered. When the suction head 821 is lowered to the label applying position R, the suction on the label 96 is substantially eliminated, so that the label 96 can reliably be applied to the article X without remaining stuck to the lower surface 824b under vacuum.

After the label 96 is applied to the article X, the rotation of the motor 814 is reversed to move the belt 818 in the direction opposite to the direction of the arrow M. The suction head 821 is moved upwardly by the slide member 811 and the arm 820 to the label receiving position Q shown in FIG. 10. At this time, the upper inclined surface 831a of the hooked portion 831a of the latch 831 engages the lower portion of the roller 832 to force the same to turn the latch lever 833 in the direction of the arrow J. When the hooked portion 831a is moved past the roller 832, the latch lever 833 is returned to the position of FIG. 10 under the bias of the spring 836, whereupon the latch lever 833 engages the latch 831. The latch 831, the slide member 811, the arm 820, and the suction head 821 are now fixed in the position of FIG. 10. At this time, the shutter 839 fixed to the rear surface of the latch 831 is positioned between the light-emitting element and light-detector of the photosensor 841, which issues a signal to de-energize the motor 814. Upon engagement of the projection 822b with the stopper 829, the suction head 821 is tilted to raise its front portion against the force of the spring 828 into the inclined position for receiving the next printed label 96. The suction head 821 now awaits the next label 96 from the printer 90.

Figure 17:
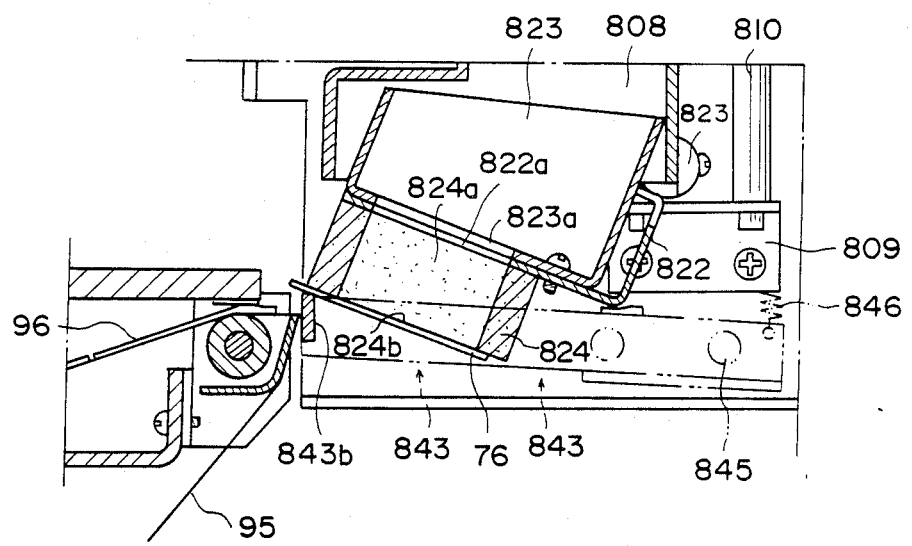
FIG. 17 is a fragmentary vertical cross-sectional view showing the manner in which a label is lifted.

When the printed label 96 is discharged from the label issuing unit 91 for being held against the lower surface 824b, the trailing end 96a of the label 96 may sometimes remain stuck to the base sheet 95 with the label 96 stopped. In the suction head 821 were lowered under such a condition, the label 96 held against the suction head 821 would slide off the surface 824b and the suction head 821 would be lowered without carrying the label 96. With the labeling machine 8 of the present invention, however, the solenoid 844 of the label peeling mechanism 842 is energized when the discharging of the label 96 is stopped. The separation member 842 is then turned in the direction of the arrow K against the force of the spring 846 to enable the lifting portion 843b to lift the trailing end 96a of the label 96 off the base sheet 95 as shown in FIG. 17. The trailing end 96a of the label 96 is therefore reliably peeled off the base sheet 95 without fail, and the trouble of label application failure is prevented. When the lifting portion 843b peels the label 96 off the base sheet 96, its upper edge engages the label 96. However, since the upper edge of the lifting portion 843b has a reduced area because of the recesses 843c, the label 96 is prevented from remaining attached to the lifting portion 843b.

When the labeling machine 8 is angularly moved away from the printer 90, the separation member 843 is also moved away from the peeling member 94 of the printer 90. Therefore, the separation member 843 does not obstruct the label sheet 97 or its base sheet 95 as it is turned around the peeling member 94 when the label sheet 97 is set into the printer 90.

Figure 18:
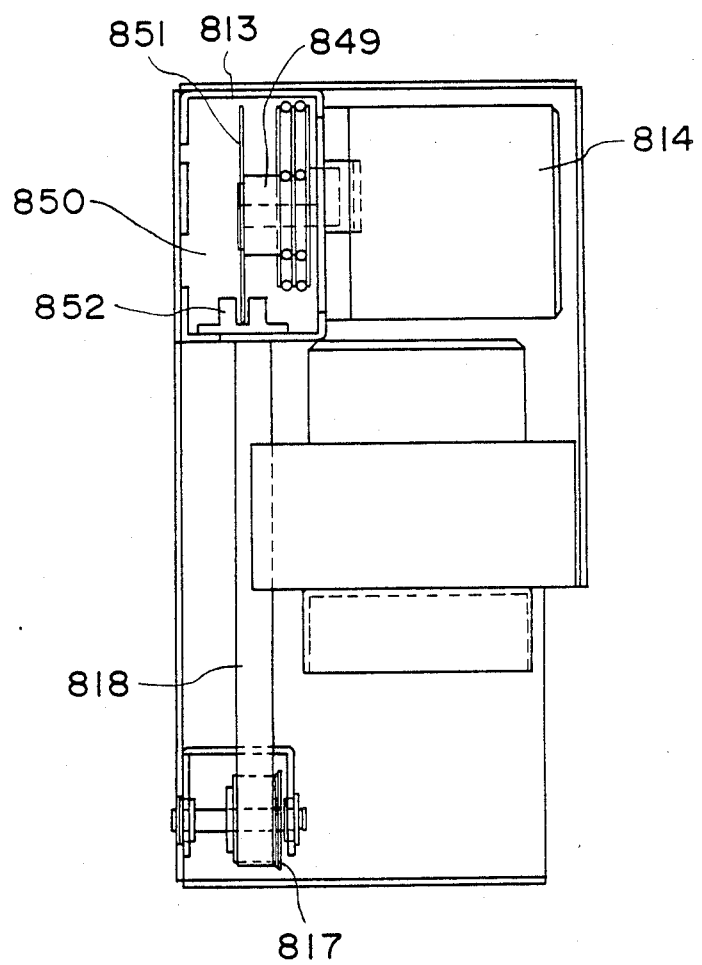
FIG. 18 is a cross-sectional view of a rotary encoder in the labeling machine.

Another way of detecting the timing of reversing the arm 820 of the labeling machine 8 will be described with reference to FIG. 18. A rotary encoder 850 is composed of a slit disc 851 attached to the end of the shaft 849 of the motor 814 and a photointerrupter 852 attached to the bracket 813. The rotary encoder 850 detects the speed of rotation of the motor 814 by the width of a pulse generated by the photointerrupter 852 or the number of pulses generated thereby in a fixed period of time. When the arm 820 (FIG. 10) is being lowered toward the article X, the arm 820 travels at a constant speed until the suction head engages the article. After the suction head has engaged the article, the speed of travel of the arm 820 is suddenly dropped. Therefore, the rotary encoder 850 generates pulses of substantially constant durations while the arm 830 is being lowered prior to engagement with the article, and generates pulses of longer durations while the arm 830 has engaged the article. Accordingly, the arm 820 can be reversed in its direction of travel when a longer pulse duration is detected. This arrangement is advantageous in that the structure and operation are simple since it is not necessary to attach a sensor cable to the arm, and no adjustment is required for different article heights.

Figure 19:
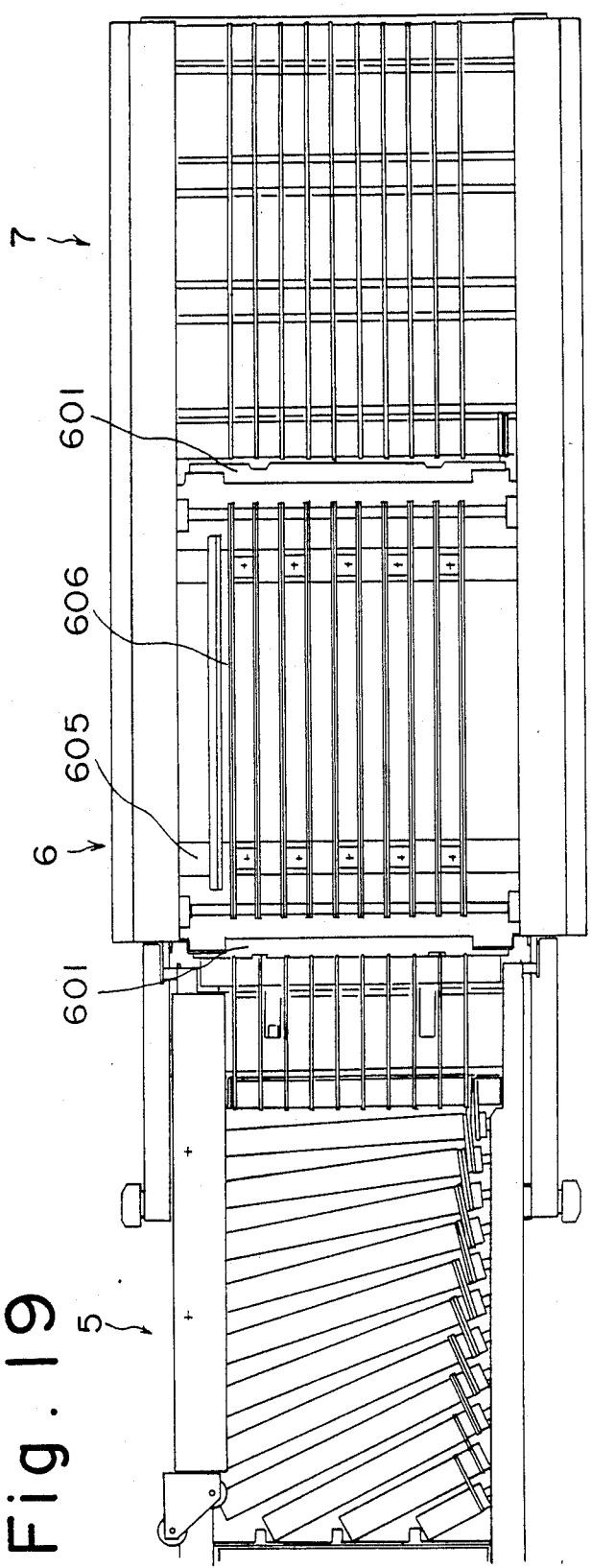
FIG. 19 is a plan view of a weighing machine.
Figure 20:
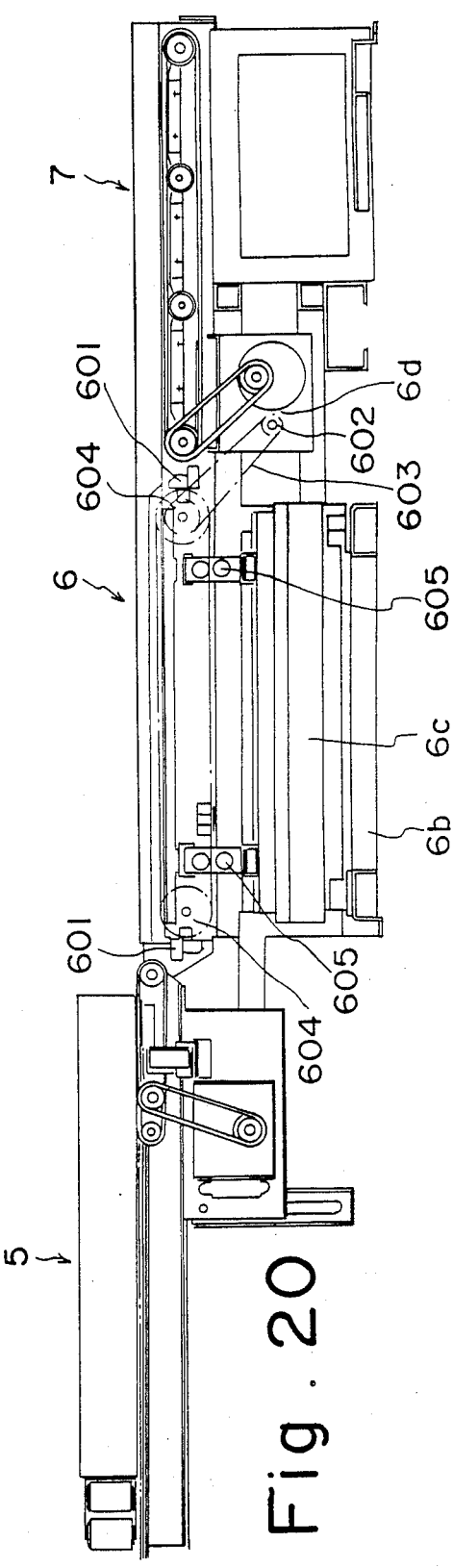
FIG. 20 is a side elevational view of the weighing machine.

FIGS. 19 and 20 show another preferred embodiment of the weighing machine 6. In the aforesaid weighing machine, the weight of the drive motor 6d and the weight of the article are imposed on the load cell 6c. In the arrangement of FIGS. 19 and 20, however, the drive motor 6d is separated from the load cell 6c for an increased processing speed and a smaller weighing machine size. More specifically, the weighing machine 6 has a weighing base comprising a plurality of parallel weighing plates 606 disposed on support plates 605 for the load cell 6c. The drive motor 6d is mounted on a frame below the labeling conveyor 7 for driving driven pulleys 604 through a driver pulley 602 and a belt 603. A belt 607 is trained around the driven pulleys 604 with conveyor plates 601 attached to the belt 607. The conveyor plates 601 are cyclically moved upwardly and downwardly around the weiging base. When the conveyor plates 601 are positioned as shown in FIGS. 19 and 20, an article is placed from the displacing conveyor 5 onto the weighing base, weighed, and then pushed by one of the conveyor plates 601 onto the labeling conveyor 7.

Figure 21:
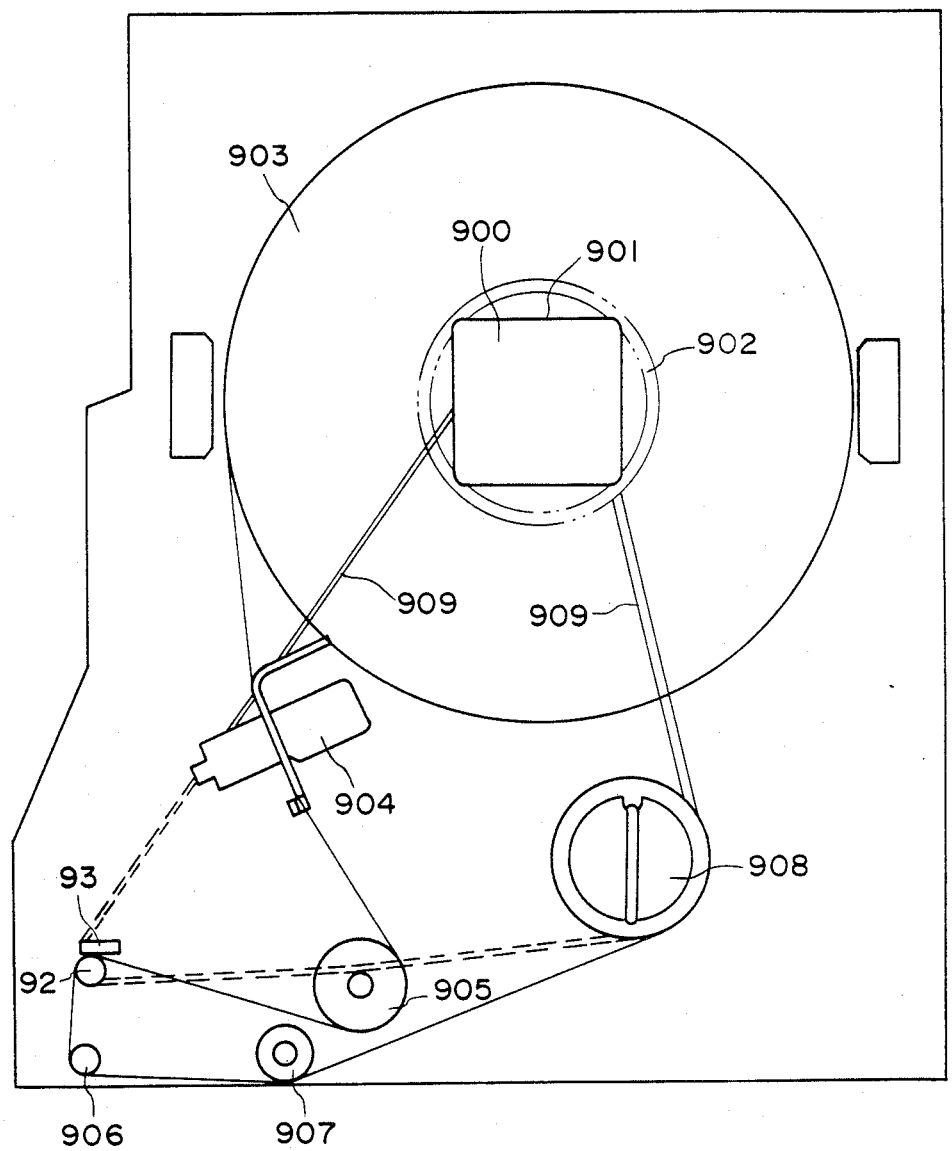
FIG. 21 is a schematic cross-sectional view of a printer.

The printer 90 will briefly be described with reference to FIG. 21. The printer 90 has a motor 900 for driving a base sheet takeup reel 908 operatively coupled by a timing belt 909 for winding the label sheet. The motor 900 has a casing 901 used as a guide for the core of a label roll 903. The label roll 903 is attached to the motor 900, and the label sheet unwound from the label roll 903 is wound by the takeup reel through a braking device 904, a guide 905, a platen 92, and guides 906, 907. The printer 90 is of a compact structure since the casing of the drive motor 900 is used as the guide or the core of the label roll.

Although certain preferred embodiments have been shown and described, it should be understood that many changes and modifications may be made therein without departing from the scope of the appended claims.

What I claim is:

1. A system for packaging, weighting and labeling articles, comprising:
   a packaging device for packaging the article;
   a weighing and labeling device disposed parallel to said packaging device and having a weighing machine for weighing the article packaged by said packaging device and a labeling machine for printing the price corresponding to the weight measured by said weighing machine and applying the printed label to the article; and
   a turn conveyor for turning the article substantially through 90° with respect to the direction of feed while the article is being conveyed by said turn conveyor, said turn conveyor having a mount, first and second base members disposed on said mount, a first turning conveyor section having a plurality of longer and shorter rollers of cylindrical shape arranged alternately in a sectorial pattern on said first base member and providing a conveyor path of a 90-degree arc extending from an inlet thereof, a second turning conveyor section having a plurality of longer and shorter rollers of cylindrical shape arranged alternately in a sectorial pattern on said second base member and providing a conveyor path of a 90-degree arc extending from an outlet of said first turning conveyor section, means for driving said longer and shorter rollers, and an intermediate conveyor section between said first and second turning conveyor sections comprising a plurality of belts trained around a roller at a terminal end of said first turning conveyor section and a roller at a starting end of said second turning conveyor section, said turn conveyor connecting an article outlet of said packaging device to an article inlet of said weighing and labeling device, and said first and second base members being mounted on said mount with the distance between said first and second base members being adjustable.

2. A system according to claim 1, wherein said turn conveyor comprises a plurality of cylindrical rollers arranged in a sectorial pattern and each having equal peripheral speeds at inner and outer ends, and drive means for rotating said cylindrical rollers in a perscribed direction.

3. A system according to claim 2, wherein said cylindrical rollers include longer and shorter rollers arranged alternately with their outer ends alinged along the arc of said sectorial pattern.

4. A system according to claim 1, wherein said first and second turning conveyor sections are symmetrical in shape with respect to said intermediate conveyor section.

5. A system according to claim 1, wherein said weighing and labeling device has a displacing conveyor having a plurality of rollers arranged obliquely for conveying the article obliquely in a forward direction along a guide surface located on one side of the rollers, said rollers including rollers located closely to a starting end thereof and inclined at an angle with respect to a direction normal to said guide surface, and rollers located closely to a terminal end of the displacing conveyor and inclined at progressively smaller angels with respect to the direction normal to said guide surface, and said displacing conveyor being connected to an outlet of said turn conveyor for conveying the article discharged from said turn conveyor while displacing the article laterally to one side.

6. A system according to claim 1, wherein said labeling machine comprises a suction head for receiving the printed label with its adhesive-coated side facing downwardly, an arm with said suction head mounted on its lower end, a motor for vertically moving said arm to vertically move said suction head between an upper label receiving position and a lower label applying position, a latch mechanism for holding said arm at its upper limit of movement to keep said suction head in said label receiving position, an intake box having a lower opening which is closable by said suction head when the suction head is in said label receiving position, and a blower for drawing air from said intake box to produce suction for holding the printed label against a lower surface of said suction head as it is in said label receiving position.

7. A system according to claim 6, wherein said motor comprises a torque motor which can be stopped under reactive forces when said suction head is pressed against the article when it is in said label applying position.

8. A system according to claim 7, wherein said suction head is tiltably mounted on the lower end of said arm to follow an irregular surface of the article where said label is to be applied.

9. A system according to claim 6, wherein said latch mechanism comprises a latch fixed to said arm and having a hooked portion, an angularly movable latch lever having a distal end engageable with said hooked portion under the bias of a spring, a solenoid for turning said latch lever against the bias of said spring to disengage said latch lever from said hooked portion, and a roller rotatably mounted on said distal end of the latch lever for smooth engagement with and disengagement from said hooked portion.

10. A system according to claim 6, wherein said labeling machine includes a separation member disposed transversely of the label below a position in which said suction head is located closely to a peeling member for peeling the label from a base sheet, said separation member being movable upwardly to engage and lift the trailing end of the label completely off said base sheet.

11. A system according to claim 10, wherein said separation member includes a label lifting portion having a plurality of recesses defined in an upper end thereof.

12. A system according to claim 6, including a rotary encoder coupled to said motor for detecting the timing of application of the label to the article.

13. A system according to claim 1, including a motor independent of said weighing machine for conveying the article in said weighing machine.

14. A system according to claim 1, wherein said labeling mechine includes a printer for printing the label, said printer having a casing serving as a guide for the core of a label roll from which said label is supplied.

* * * * *

UNITED STATES PATENT AND TRADEMARK OFFICE
CERTIFICATE OF CORRECTION

PATENT NO. : 4,683,707

DATED : AUGUST 4, 1987

INVENTOR(S) : KAZUO. KOYAMA

It is certified that error appears in the above-identified patent and that said Letters Patent is hereby corrected as shown below:

```
Col. 5, line 2, delete "of" (second occurrence).

Col. 7, line 60, "converyor" should be --conveyor--.

Col. 8, line 45, "covneyor" should be --conveyor--.

Col. 9, line 31, delete "be".

Col. 10, line 2, after "turned" insert --in--;
         line 19, change "undsired" to --undesired--;
         line 34, "fowardly" should be --forwardly--.

Col. 12, line 9, "320" should be --820--;
         line 52, "disl" should be --distal--.

Col. 15, line 46, "load" should be --load--.

Col. 16, line 8, "label" should be --label--;
         line 15, "weighting" should be --weighing--;
         line 67, "alinged" should be --aligned--.

Col. 18, line 31, "mechine" should
```

Signed and Sealed this

Second Day of February, 1988

Attest:

DONALD J. QUIGG

Attesting Officer

Commissioner of Patents and Trademarks